United States Patent
Kashihara et al.

(10) Patent No.: US 7,082,566 B2
(45) Date of Patent: Jul. 25, 2006

(54) SIGNAL QUALITY EVALUATION METHOD, INFORMATION RECORDING/REPRODUCING SYSTEM, AND RECORDING COMPENSATION METHOD

(75) Inventors: Yutaka Kashihara, Chigasaki (JP); Yuji Nagai, Kawasaki (JP); Akihito Ogawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 484 days.

(21) Appl. No.: 10/290,474

(22) Filed: Nov. 8, 2002

(65) Prior Publication Data

US 2003/0090980 A1    May 15, 2003

(30) Foreign Application Priority Data

Nov. 9, 2001   (JP)  ............................. 2001-345188
Jul. 30, 2002   (JP)  ............................. 2002-221832

(51) Int. Cl.
*H03M 13/02* (2006.01)
*H03D 1/00* (2006.01)
*G11B 20/18* (2006.01)

(52) U.S. Cl. .................... 714/795; 375/341; 369/53.31

(58) Field of Classification Search ............ 369/53.31, 369/59.22, 59.24; 714/795; G11B 20/18; H03M 13/02
See application file for complete search history.

(56) References Cited

U.S. PATENT DOCUMENTS

| | | | | |
|---|---|---|---|---|
| 5,295,130 A * | 3/1994 | Tobita et al. | ........... | 369/124.15 |
| 5,938,791 A * | 8/1999 | Narahara | ..................... | 714/795 |
| 6,089,749 A * | 7/2000 | Blaum et al. | ................ | 714/798 |
| 6,148,043 A * | 11/2000 | Fujimoto | .................... | 375/341 |
| 6,215,751 B1* | 4/2001 | Tsuchinaga | ............... | 369/47.35 |
| 6,289,059 B1* | 9/2001 | Yamaguchi et al. | ........ | 375/341 |
| 6,587,417 B1* | 7/2003 | Okamoto et al. | ........ | 369/59.22 |
| 2003/0043939 A1* | 3/2003 | Okumura et al. | ........... | 375/341 |

FOREIGN PATENT DOCUMENTS

JP           2000-90436           3/2000

* cited by examiner

*Primary Examiner*—Aristotelis M. Psitos

(74) *Attorney, Agent, or Firm*—Pillsbury Winthrop Shaw Pittman, LLP

(57) ABSTRACT

Signal quality evaluation is performed using a predetermined reproduction signal, a first pattern corresponding to a signal waveform pattern of the reproduction signal, and a given pattern corresponding to the signal waveform pattern of the reproduction signal and being different from the first pattern.

5 Claims, 21 Drawing Sheets

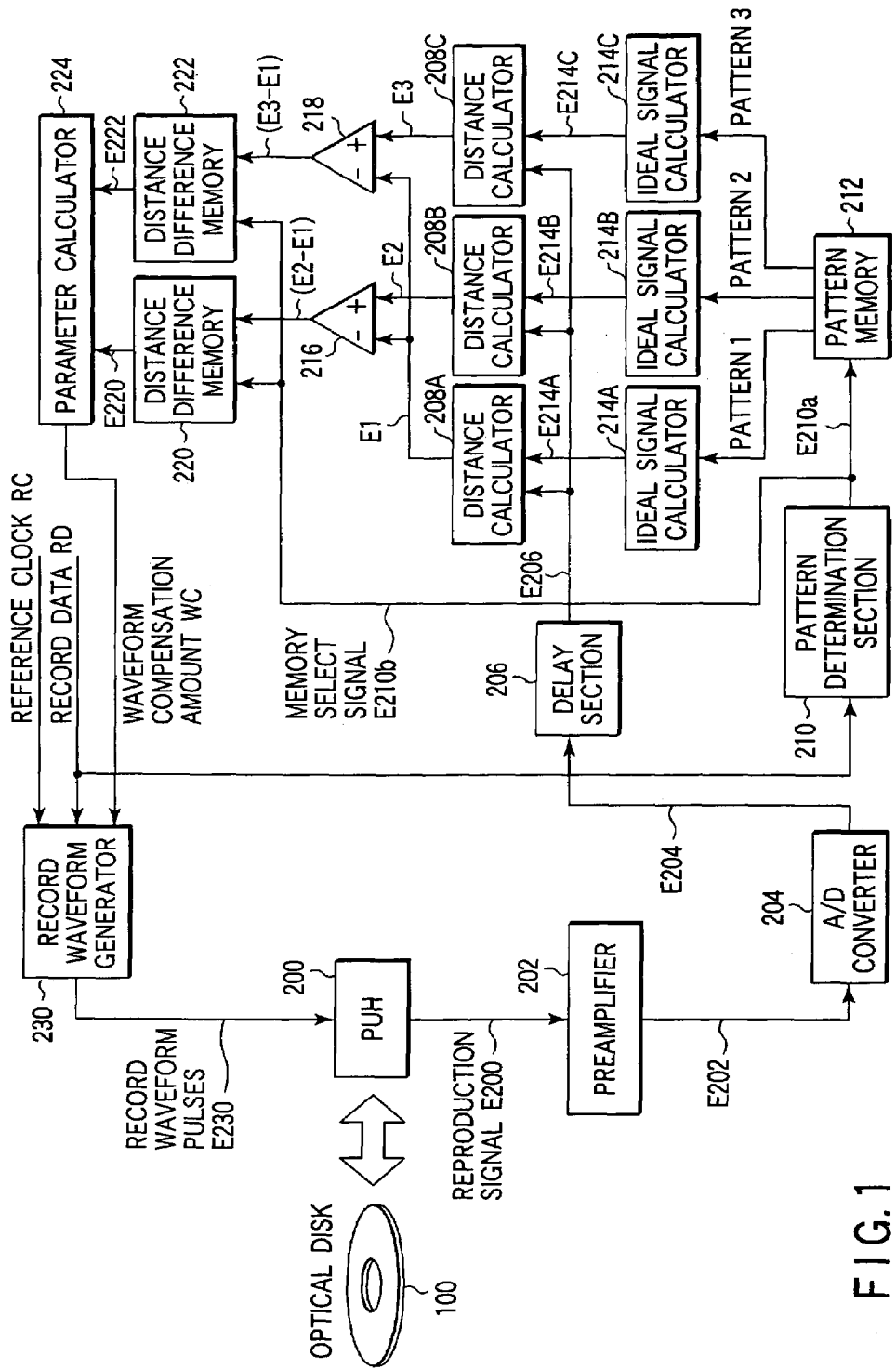
F I G. 1

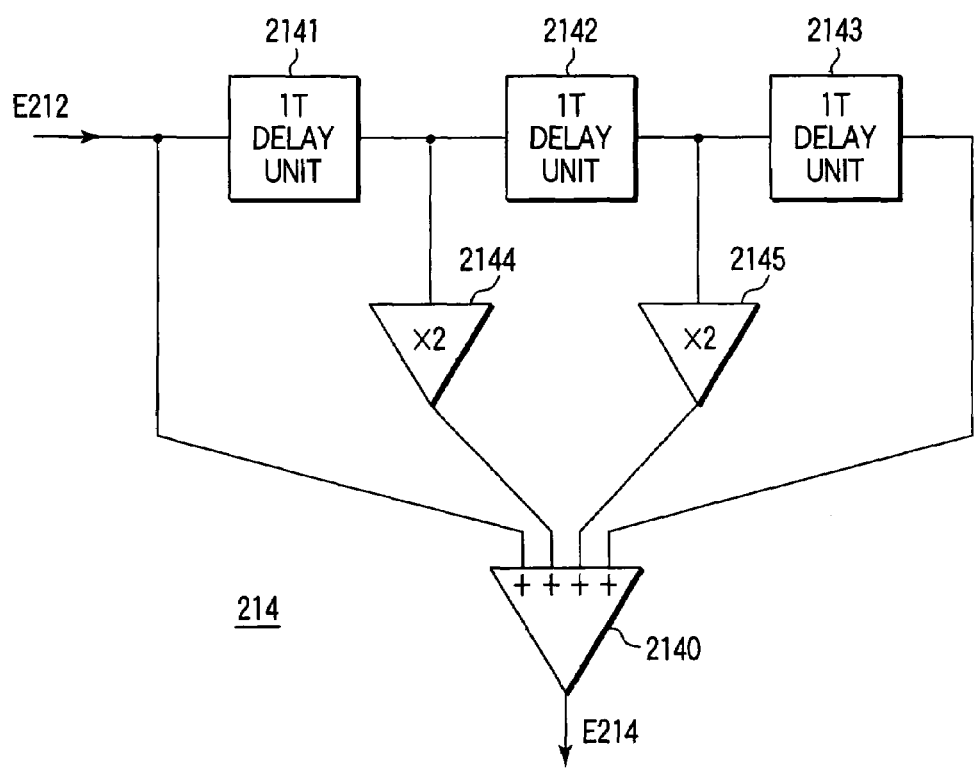
F I G. 2

MEC (E220/E222)
FOR MARK REAR
END CONTROL

|   | 2 | 3 | 4 |
|---|---|---|---|
| 2 |   |   |   |
| 3 |   |   |   |
| 4 |   |   |   |

MSC (E220/E222)
FOR MARK FRONT
END CONTROL

|   | 2 | 3 | 4 |
|---|---|---|---|
| 2 |   |   |   |
| 3 |   |   |   |
| 4 |   |   |   |

| PATTERN 1 | PATTERN 2 | PATTERN 3 |
|---|---|---|
| 000011001111 | 000110001111 | 000011100111 |
| 000111001111 | 000110001111 | 000111100111 |
| 001111001111 | 001110001111 | 001111100111 |
| 000011000111 | 000110000111 | 000011100111 |
| 000111000111 | 000110000111 | 000111100111 |
| 001111000111 | 001110000111 | 001111100111 |
| 000011000011 | 000110000011 | 000011100011 |
| 000111000011 | 000110000011 | 000111100011 |
| 001111000011 | 001110000011 | 001111100011 |
| 111100110000 | 111001110000 | 111100011000 |
| 111000110000 | 111001110000 | 111000011000 |
| 110000110000 | 110001110000 | 110000011000 |
| 111100111000 | 111001111000 | 111100011000 |
| 111000111000 | 111001111000 | 111000011000 |
| 110000111000 | 110001111000 | 110000011000 |
| 111100111100 | 111001111100 | 111100011100 |
| 111000111100 | 111001111100 | 111000011100 |
| 110000111100 | 110001111100 | 110000011100 |

| M1 | 2 | 3 | 4 |
|---|---|---|---|
| 2 | a | b | c |
| 3 | d | e | f |
| 4 | g | h | i |

| M2 | 2 | 3 | 4 |
|---|---|---|---|
| 2 | α | β | χ |
| 3 | δ | ε | φ |
| 4 | γ | η | ι |

| M3 | 2 | 3 | 4 |
|---|---|---|---|
| 2 | a' | b' | c' |
| 3 | d' | e' | f' |
| 4 | g' | h' | i' |

FOR MARK REAR END CONTROL

| M1 | 2 | 3 | 4 |
|---|---|---|---|
| 2 | j | k | l |
| 3 | m | n | o |
| 4 | p | q | r |

| M2 | 2 | 3 | 4 |
|---|---|---|---|
| 2 | ψ | κ | λ |
| 3 | μ | ν | o |
| 4 | π | θ | ρ |

| M3 | 2 | 3 | 4 |
|---|---|---|---|
| 2 | j' | k' | l' |
| 3 | m' | n' | o' |
| 4 | p' | q' | r' |

FOR MARK FRONT END CONTROL

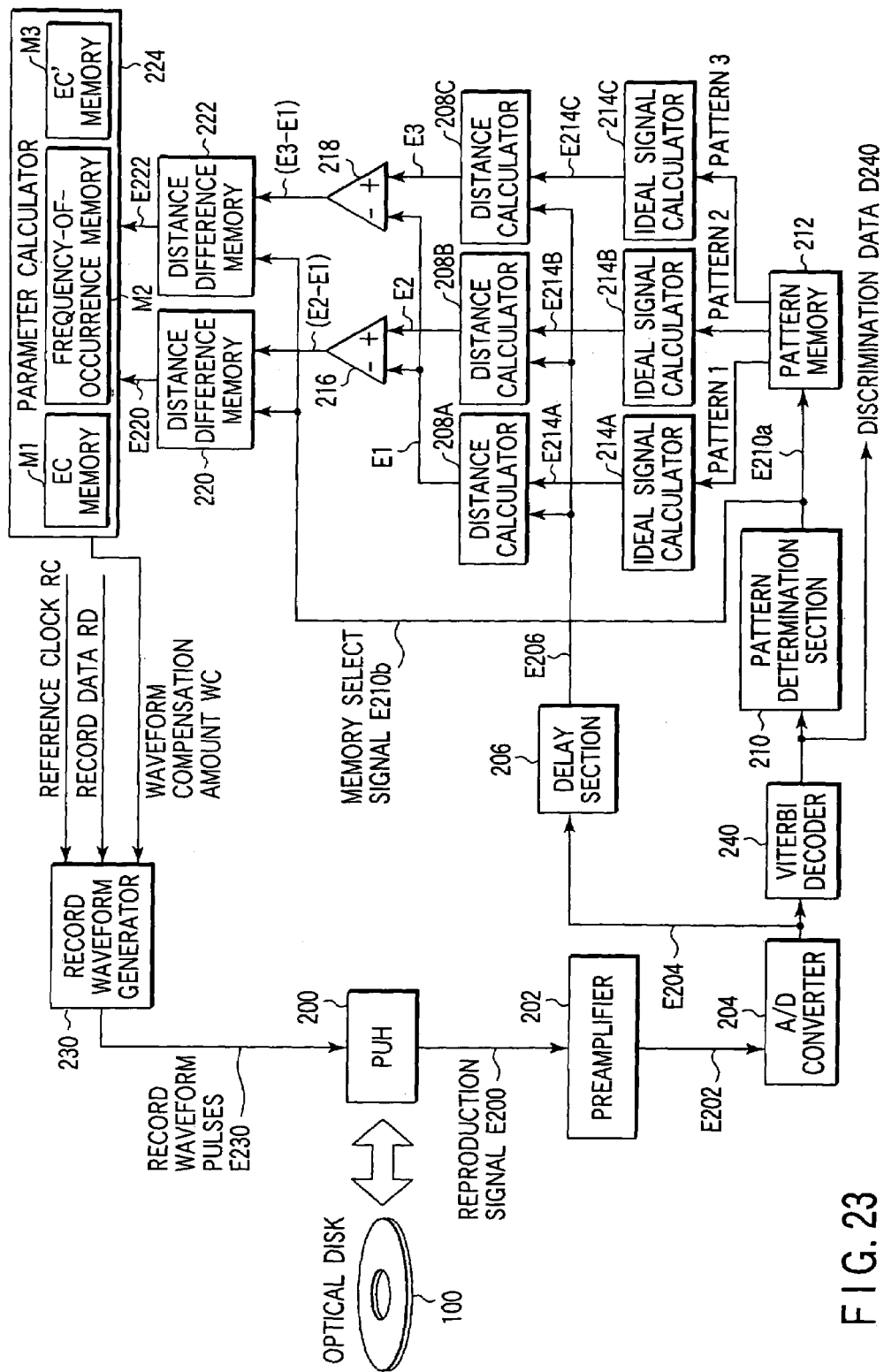
F I G. 23

SIGNAL QUALITY EVALUATION METHOD, INFORMATION RECORDING/REPRODUCING SYSTEM, AND RECORDING COMPENSATION METHOD

CROSS-REFERENCE TO RELATED APPLICATIONS

This application is based upon and claims the benefit of priority from the prior Japanese Patent Applications No. 2001-345188, filed Nov. 9, 2001; and No. 2002-221832, filed Jul. 30, 2002, the entire contents of both of which are incorporated herein by reference.

BACKGROUND OF THE INVENTION

1. Field of the Invention

The present invention relates to an improvement of signal processing in information recording/reproduction using an information medium such as an optical disk. In particular, this invention relates to a method of evaluating a signal quality in information recording/reproduction, an improvement of an information recording/reproducing system, and an improvement of a recording compensation method.

2. Description of the Related Art

Jpn. Pat. Appln. KOKAI Publication No. 2000-90436 describes a prior-art information recording system using an optical disk. In brief, in this system, information recorded on an optical disk is reproduced as a weak analog signal using a PUH (pick-up head). The reproduced analog signal is amplified by a pre-amplifier to have a sufficiently high signal level, and then the resultant signal is converted by a level slicer to a binary signal corresponding to a mark/space.

On the other hand, a channel clock signal that is phase-synchronized with the binary signal is generated from a PLL (phase lock loop) circuit. Based on the binary signal and the channel clock signal, parameter calculation means calculates a waveform correction amount. Further, based on the waveform correction amount, record data and a reference clock signal, record waveform generating means generates record waveform pulses. A laser beam corresponding to the record waveform pulses is radiated on the optical disk from the PUH, and information corresponding to the record data is recorded on the optical disk as marks/spaces.

In the above prior art, the waveform compensation amount is calculated from the phase difference between the rising edge or falling edge of the binary signal and the channel clock signal. This technique is effective when the slicing method is adopted for discriminating the content of the reproduction signal. However, this technique is not applicable to the case of, e.g. an integral detection method wherein the reproduction signal is discriminated based on the amplitude value of a reproduction signal sample. In particular, where the recording density is high as in the case of an optical disk system using a blue light laser, the use of the slicing method as the discrimination method is inadequate, and a high-level discrimination method such as a PRML (Partial Response and Maximum Likelihood) method is required. In the PRML method, too, the reproduction signal content is discriminated based on the amplitude value of the reproduction signal sample, and thus the above-described prior art is inapplicable. In short, the reproduction signal quality cannot properly be evaluated or a proper waveform correction amount cannot be calculated in the technique wherein the reproduction signal is discriminated on the basis of the amplitude value of the reproduction signal sample.

BRIEF SUMMARY OF THE INVENTION

The present invention has been made in consideration of the above-described circumstances, and an object thereof is to provide a method capable of properly evaluating the quality of a reproduction signal in the technique wherein the reproduction signal is discriminated on the basis of the amplitude value of a reproduction signal sample.

It is also an object of the invention to provide a system or a method capable of properly calculating a waveform correction amount in the technique wherein the reproduction signal is discriminated on the basis of the amplitude value of a reproduction signal sample.

In order to achieve the objects, according to an aspect of the invention, there is provided a signal quality evaluation method for a reproduction signal, wherein a predetermined reproduction signal (E200), a first pattern corresponding to a signal waveform pattern of the reproduction signal (E200), and a given pattern corresponding to the signal waveform pattern of the reproduction signal (E200) and being different from the first pattern, are used. A distance difference D (Ee–Eo; equation 18) between a distance Eo between the reproduction signal (E200) and the first pattern, on the one hand, and a distance Ee between the reproduction signal (E200) and the given pattern, on the other, is found. Then, a distribution (FIGS. 5A and 5B) of the distance difference D with respect to a plurality of samples of the reproduction signal is found. Subsequently, a quality evaluation parameter (M/$\sigma$; equation 19) of the reproduction signal (E200) is determined on the basis of a ratio between a mean value M of the distance difference D and a standard deviation $\sigma$ of the distribution of the distance difference D. Thus, the quality of the reproduction signal (E200) is evaluated on the basis of an index (evaluation index Mgn in equation 19) expressed by the quality evaluation parameter (M/$\sigma$).

According to another aspect of the invention, there is provided an information recording/reproducing system using a method (PRML method) of discriminating a signal content from an amplitude value of a signal sample. The system comprises: pattern providing means (pattern memory 212) for providing a first pattern including a code bit train "10" or "01", a second pattern including "11" corresponding to the code bit train "10" or "01", and a third pattern including "00" corresponding to the code bit train "10" or "01"; recording/reproducing means (200, 230) for recording/reproducing the first pattern using a predetermined information recording medium (optical disk 100); and compensation amount calculation means (202 to 224) for calculating a record compensation amount (WC) for the information recording medium (100), on the basis of a first probability (FIG. 5A) that a reproduction signal (E200) of the first pattern obtained by the recording/reproducing means (200, 230) is recognized as corresponding to the second pattern, and a second probability (FIG. 5B) that a reproduction signal of the first pattern obtained by the recording/reproducing means is recognized as corresponding to the third pattern.

According to still another aspect of the invention, there is provided a recording compensation method for performing information recording on an information recording medium (optical disk 100) or information reproduction from the information recording medium, using a predetermined reproduction signal (E200), a first pattern corresponding to a signal waveform pattern of the reproduction signal (E200), a second pattern corresponding to the signal waveform pattern of the reproduction signal (E200) and being different from the first pattern, and a third pattern corresponding to the signal waveform pattern of the reproduction signal (E200) and being different from the first pattern and the second pattern. In this method, a first distance E1 (equation 2) between the reproduction signal (E200) and the first pattern, a second distance E2 (equation 3) between the reproduction signal (E200) and the second pattern, and a third distance E3 (equation 4) between the reproduction signal (E200) and the third pattern, are found. Then, a first distance difference D2=E2−E1 (equation 7) between the first distance E1 and the second distance E2, and a second distance difference D3=E3−E1 (equation 8) between the first distance E1 and the third distance E3, are found. Subsequently, a distribution (FIG. 5A) of the first distance difference D2 and a distribution (FIG. 5B) of the second distance difference D3 with respect to a plurality of samples of the reproduction signal are found. Thereafter, a mean value M2 of the first distance difference D2 and a standard deviation σ2 of the distribution (FIG. 5A) of the first distance difference D2, and a mean value M3 of the second distance difference D3 and a standard deviation σ3 of the distribution (FIG. 5B) of the second distance difference D3, are found. Then, a recording compensation parameter (Ec in equation 13; the unit is Euclidean distance) is found from a relationship of $(\sigma 2*M3+\sigma 3*M2)/(\sigma 2+\sigma 3)$. Thus, a signal recording waveform (FIGS. 8B to 8D) for the information recording medium (100) is compensated ("record waveform adaptive control") on the basis of the recording compensation parameter (Ec).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the structure of an information recording/reproducing system according to a first embodiment of the present invention;

FIG. 2 shows an example of the structure of an ideal signal calculator used in the system shown in FIG. 1;

FIG. 3 shows a first example of the relationship between contents of a pattern memory (patterns 1, 2 and 3) and contents of a distance difference memory (for mark rear end control and mark front end control) used in the system of FIG. 1;

FIG. 19 illustrates conversion from quality evaluation parameter Ec to quality evaluation parameter Ec' such the DC level may not vary before and after compensation;

FIG. 23 shows the structure of an information recording/reproducing system according to a fourth embodiment of the present invention.

DETAILED DESCRIPTION OF THE INVENTION

Figure 4:
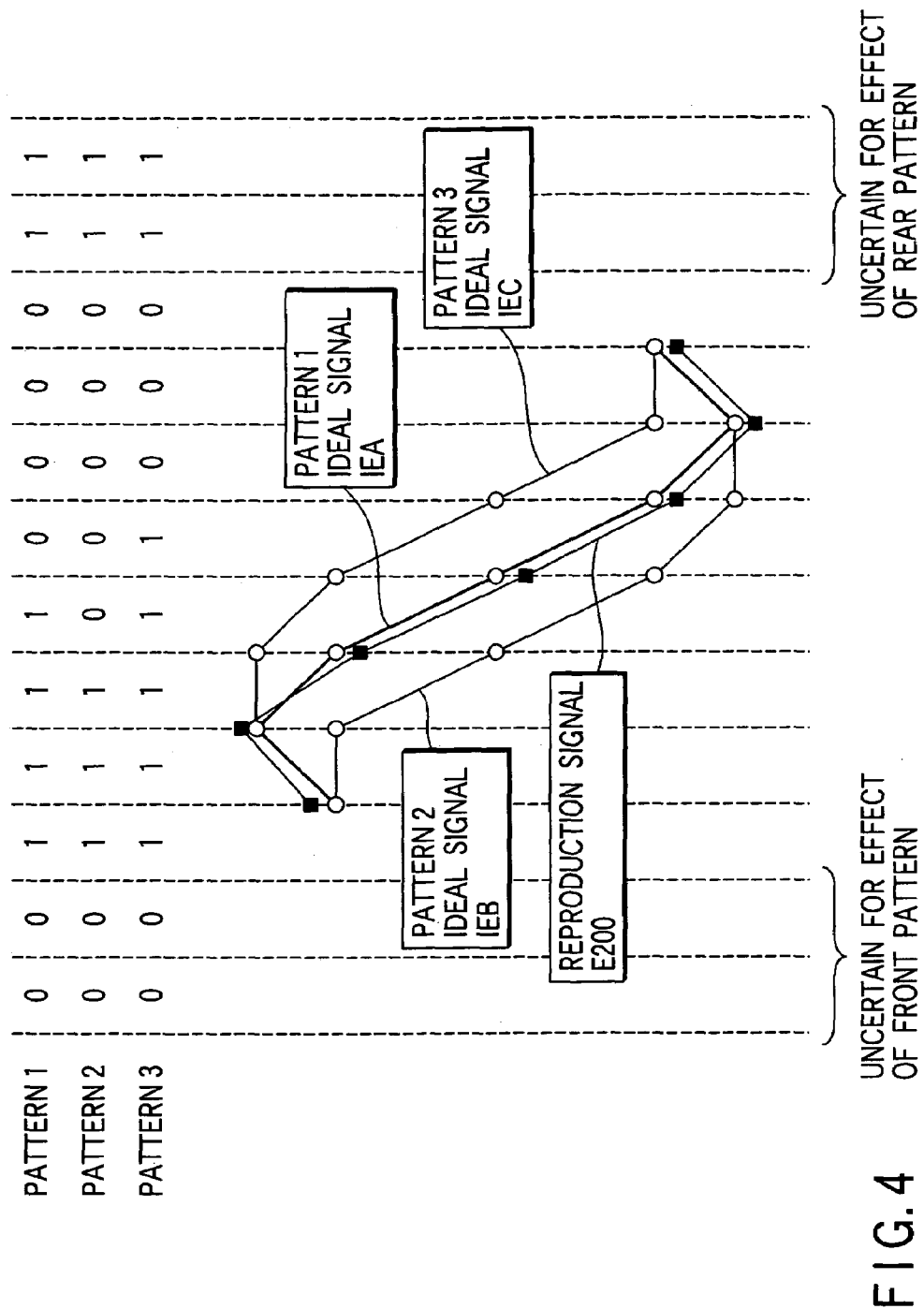
FIG. 4 shows a relationship between a reproduced signal (E200) and an ideal signal (IEA, IEB, IEC) in the structure shown in FIG. 1.

Embodiments of a signal quality evaluation, an information recording/reproducing system, a recording compensation method and an information medium according to the present invention will now be described with reference to the accompanying drawings.

FIG. 1 shows the structure of an information recording/reproducing system according to a first embodiment of the present invention.

In FIG. 1, information recorded on an optical disk 100 in the form of marks/spaces (not shown) is read out by a pickup head (PUH) 200 as a weak analog reproduction signal E200. The reproduction signal E200 is sufficiently amplified by a preamplifier 202. The amplified analog reproduction signal E202 is converted to a digital reproduction signal E204 by an A/D converter 204. The digital reproduction signal E204 is properly delayed by a delay section 206. The delayed signal E206 is input to distance calculators 208A to 208C.

On the other hand, a plurality of kinds of preset patterns are registered in a pattern determination section 210. When record data RD to be recorded on the optical disk 100 and a registered pattern in the pattern determination section 210 coincide (or match), the pattern determination section 210 outputs a pattern indication signal E210a (which may be a two-bit signal if the number of kinds of patterns to be used is three) indicating which of the registered patterns is associated with the coincident (or matching) record data RD.

A pattern memory 212 outputs three kinds of binary patterns (pattern 1, pattern 2 and pattern 3), which are registered therein, in accordance with the content of the pattern instruction signal E210a from the pattern determination section 210. The output binary patterns (pattern 1, pattern 2 and pattern 3) are delivered to ideal signal calculators 214A, 214B and 214C.

The ideal signal calculators 214A to 214C produce ideal reproduction signals E214A to E214C (hereinafter referred to as "ideal signals"; the relationship between signal patterns of ideal signals and reproduction signals will be described referring to FIG. 4) corresponding to used PR characteristics (partial response characteristics) on the basis of the delivered binary patterns (pattern 1, pattern 2 and pattern 3).

The ideal signals E214A to E214C are supplied to the distance calculators 208A to 208C. The delayed signal E206 from the delay section 206 is also input to the distance calculators 208A to 208C. The amount of delay by the delay section 206 is set such that the ideal signals E214A to E214C and the reproduction signal E204 are brought in phase.

The distance calculator, 208A–208C, calculates a distance (a Euclidean distance to be described later) between the ideal signal, E214A–E214C, and the reproduction signal E206 (calculated distances=E1, E2 and E3). The calculated distances E1 and E2 are input to a subtracter 216, and the calculated distances E1 and E3 to a subtracter 218. The subtracter 216 calculates a difference between the distances E2 and E1 (E2−E1) and the subtracter 218 calculates a difference between the distances E3 and E1 (E3−E1). The calculated differences (E2−E1) and (E3−E1) are stored in distance difference memories 220 and 222.

The locations in the distance difference memories 220 and 222 are determined by a memory select signal E210b output from the pattern determination section 210 (that is, write/read addresses to the memories 220 and 222 are determined by the signal E210b).

When a predetermined amount of data has been recorded on and reproduced from the optical disk 100, a parameter calculator 224 calculates a waveform compensation amount WC for a record waveform, on the basis of the data stored in the distance difference memories 220 and 222. Specifically, the parameter calculator 224 performs predetermined parameter arithmetic operations based on the distance difference data E220 (=E2−E1) and E222 (=E3−E1) read out of the distance difference memories 220 and 222, and outputs the waveform compensation amount WC. The waveform compensation amount WC, a reference clock signal RC and record data RD are input to a record waveform generator 230. Based on the waveform compensation amount WC, reference clock signal RC and record data RD, the record waveform generator 230 generates a record waveform pulse E230 in which waveform compensation (or waveform adaptive control) has properly been made. Using the generated record waveform pulse E230, the PUH 200 records information on the optical disk 100.

Figure 7:
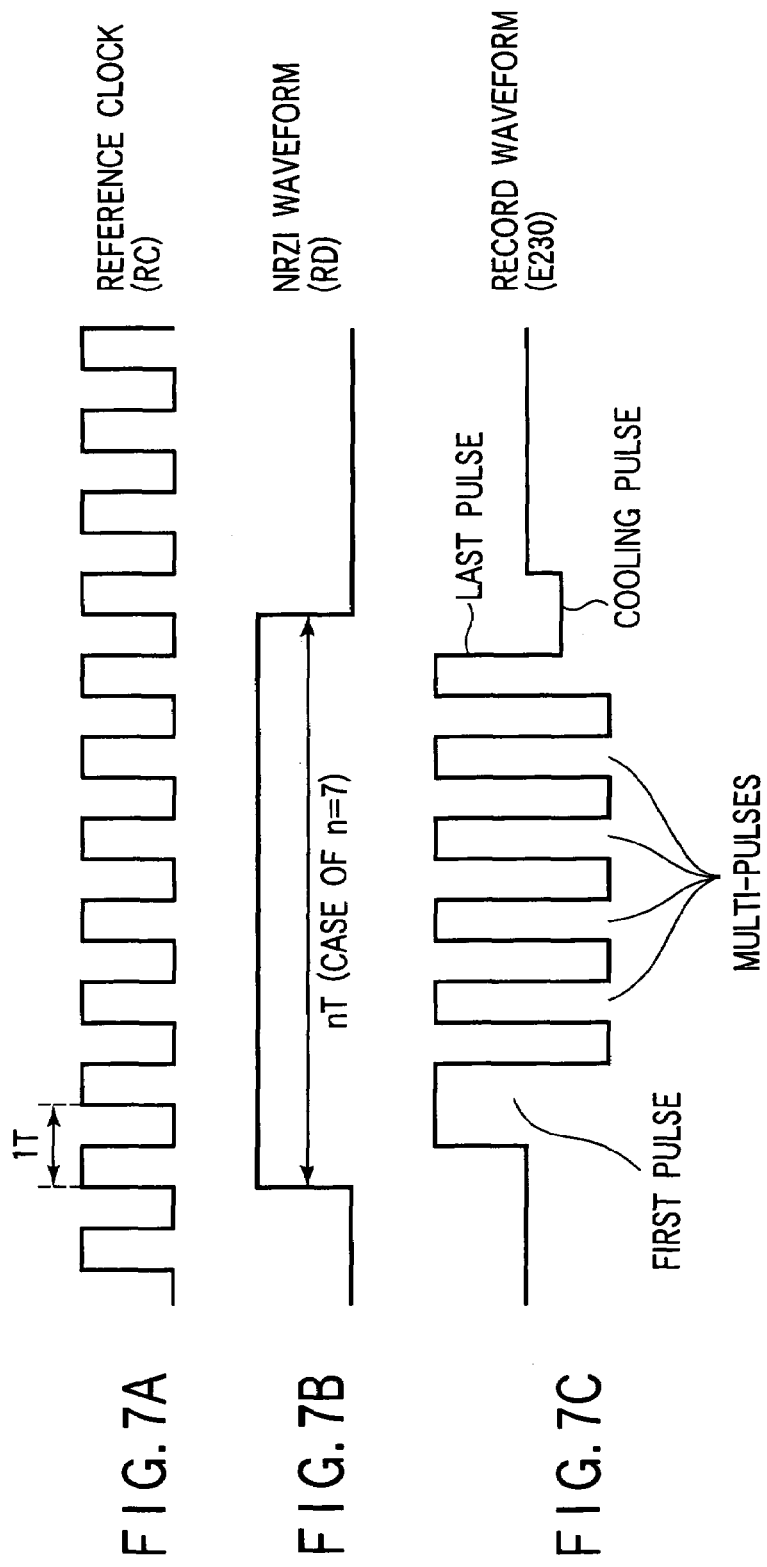
FIGS. 7A to 7C show examples of record waveform pulses used in the system of FIG. 1.

The record waveform generator 230 is so constructed as to generate record pulses E230 of a waveform as shown in FIG. 7C when it receives, for example, a reference clock signal RC with a cycle T, as shown in FIG. 7A, and a NRZI (Non-Return to Zero Inverted) waveform (corresponding to record data RD) with a length nT as shown in FIG. 7B. In addition, in accordance with the supplied waveform compensation amount WC, the pulse width of a first pulse, for example, of the record pulses E230 shown in FIG. 7C is increased or decreased. The above-mentioned Jpn. Pat. Appln. KOKAI Publication No. 2000-90436, for instance, discloses "record waveform generating means" as an internal structure of the record waveform generator 230 that generates the record waveform E230 varying in accordance with the reference clock RC, record data RD and waveform compensation amount WC. (It should be noted, however, that the waveform correction amount WCA in the embodiment of Jpn. Pat. Appln. KOKAI Publication No. 2000-90436 is technically different from the waveform compensation amount WC in the embodiment of the present invention.)

How the waveform compensation amount WC in the embodiment of the present invention is obtained will now be described with reference to FIG. 6 and other Figures. In addition, how the waveform of record waveform pulses E230 is compensated by the obtained waveform compensation amount WC will be described referring to FIGS. 7A to 7C, FIGS. 8A to 8D, and other Figures.

FIG. 2 shows an example of the structure of the ideal signal calculator 214 (214A to 214C) used in the system (apparatus) shown in FIG. 1. In this example, the ideal signal calculator 214 uses PR (1,2,2,1) characteristics as partial response characteristics. The calculator 214 is an ordinary 4-tap FIR (Finite Impulse Response) filter, and the tap coefficients are (1, 2, 2, 1).

Specifically, in the ideal signal calculator 214, delay units 2141 to 2143, each having a delay time 1T (corresponding to 1 cycle of reference clock signal RC), are connected in series. A bit train E212 of a predetermined pattern (pattern 1, 2 or 3) is input to the first delay unit 2141. The input bit train is successively delayed by 1T by the following delay units 2142 and 2143 in synchronism with the reference clock signal RC. The non-delayed bit train E212 is input to an adder 2140 with a coefficient "1". The bit train, which has been delayed by 1T by the delay unit 2141, is multiplied by a coefficient "×2" by a coefficient multiplier 2144 and input to the adder 2140. The bit train, which has been further delayed by 1T by the delay unit 2142, is multiplied by a coefficient "×2" by a coefficient multiplier 2145 and input to the adder 2140. The bit train, which has been further delayed by 1T by the delay unit 2143, is input to the adder 2140 with a coefficient "1". Thus, the adder 2140 produces an ideal signal E214 (E214A, E214B or E214C) that has been subjected to arithmetic operations corresponding to PR (1,2,2,1) characteristics.

For example, if a bit train "00010000" (E212) is input to the ideal signal calculator 214, an output "00012210" is obtained. If a bit train "000110000" is input to the ideal signal calculator 214, an output "000134310" is obtained. If a bit train "0001110000" is input to the ideal signal calculator 214, an output "000135531" is obtained. If a bit train "00011110000" is input to the ideal signal calculator 214, an output "00013565310" is obtained. With the PR (1,2,2,1) characteristics, the output (E214) of the FIR filter has any one of seven levels (0,1,2,3,4,5,6).

For convenience, a bit train with an n-number of "1" bits is expressed as "nT mark", and a bit train with an n-number of "0" bits is expressed as "nT space". If an RLL (Run-Length Limited) (1,7) code is used as a modulation code, bit trains appearing in the record data are limited to 2T to 8T marks and spaces.

In the following description of the embodiment, assume that the lengths are 2T, 3T, and ≧4T, and a mark and a space are paired, and a record compensation amount is obtained for each pattern.

FIG. 3 shows a first example of the relationship between contents of the pattern memory 212 (patterns 1, 2 and 3) and contents of the distance difference memory 220 (222) (for mark rear end control and mark front end control) used in the system (apparatus) of FIG. 1.

For example, the first row of each of patterns 1, 2 and 3, shown in the right part of FIG. 3, indicates a pattern for recording a 2T mark/2T space. A result (MEC) calculated using the first-row pattern is stored at an address indicated by an arrow in the distance difference memory 220/222 for mark rear end control.

Examples of the method of selecting patterns 2 and 3 will now be described. Pattern 2 is a pattern with a minimum Euclidean distance from an ideal signal (IEA in FIG. 4 (to be described later)) of pattern 1, under the condition that pattern 2 has bits "00" (or "11") corresponding to middle bits "10" (or "01") in the bit train of pattern 1, and the condition that the rule of the modulation code (RLL(1,7), etc.) is satisfied. Pattern 3 is a pattern with a minimum Euclidean distance from an ideal signal (IEA in FIG. 4) of pattern 1, under the condition that pattern 3 has bits "11" (or "00") corresponding to middle bits "10" (or "01") in the bit train of pattern 1, and the condition that the rule of the modulation code (RLL(1,7), etc.) is satisfied.

When two bit trains with the same length are expressed as PA(n) and PB(n) (n=0-N), the Euclidean distance is given by $$\Sigma^{n=0}N\{PA(n)-PB(n)\}^2 \quad (1)$$

The Euclidean distance will be described by giving some examples. In the second row in FIG. 3, pattern 1 is "000111001111" and pattern 2 is "000110001111". The sole difference between patterns 1 and 2 is the "10" or "00" at the middle bits.

The ideal signal (IEA in FIG. 4) of pattern 1 is "000135532356531" and the ideal signal (IEB in FIG. 4) of pattern 2 is "000134311356531". The Euclidean distance between the two bit trains is "10". In this case, a pattern having middle bits "00" and the Euclidean distance of "10" or less between the deal signal thereof and the deal signal of pattern 1 is only "1000110001111". Thus, "000110001111" is adopted as pattern 2.

Referring to the second row of pattern 3 in FIG. 3, "000111100111" is adopted. A pattern formed by replacing middle bits "10" of pattern 1 with "11" is "000111101111". The Euclidean distance between the ideal signal "000135654456531" of pattern "000111101111" and the ideal signal "000135532356531" of pattern 1 is "10". In this case, a pattern having middle bits "11" and the Euclidean distance of "10" or less between the deal signal thereof and the deal signal of pattern 1 is only "000111101111". However, the pattern "000111101111" includes a bit train "101" and violates the rule of modulation code (RLL(1,7)). Thus, "000111101111" cannot be adopted as pattern 3. The pattern, which can be adopted as pattern 3, is "000111100111" that meets the rule of modulation code (RLL(1,7)).

The Euclidean distance between the ideal signal "000135653235531" of pattern "000111100111" and the ideal signal "000135532356531" of pattern 1 is "12". In this case, a pattern, which meets the rule of modulation code (RLL(1,7)) and has middle bits "11" and the Euclidean distance of "12" or less between the deal signal thereof and the deal signal of pattern 1, is only "000111100111". Thus, "000111100111" is adopted as pattern 3.

A basic concept of the method of calculating the record compensation amount in the present embodiment will now be described with reference to FIGS. 4–6 and other Figures.

FIG. 4 shows a relationship between the reproduction signal (E200) and ideal signals (IEA, IEB, IEC) of patterns 1–3 in the structure shown in FIG. 1. Assume that patterns 1, 2 and 3 selected by the pattern determination section 210 have the contents shown in FIG. 4. Ideal signals IEA, IEB and IEC calculated from patterns 1, 2 and 3 correspond to waveforms shown in the lower part of FIG. 4. The PR characteristics in this embodiment are PR (1,2,2,1) with restriction length "4", and thus ideal signals corresponding to first three bits and last three bits of patterns 1, 2 and 3 are uncertain.

Assume that ideal signal trains (IEA, IEB, IEC) of patterns 1, 2 and 3 in FIG. 4 are P1(t), P2(t) and P3(t), and the reproduction signal is Y(t). Then, Euclidean distances E1, E2 and E3 between P1(t), P2(t) and P3(t), on the one hand, and Y(t), on the other, are given by $$E1 = \Sigma\{Y(t)-P1(t)\}^2 \quad (2)$$

$$E2 = \Sigma\{Y(t)-P2(t)\}^2 \quad (3)$$

$$E3 = \Sigma\{Y(t)-P3(t)\}^2 \quad (4)$$

The condition, under which a discrimination result of the reproduction signal is pattern E2 despite pattern 1 being recorded, is $$E1 > E2 \quad (5)$$

Similarly, the condition, under which a discrimination result of the reproduction signal is pattern E3 despite pattern 1 being recorded, is $$E1 > E3 \quad (6)$$

Now consider Euclidean distances (D2, D3) defined by $$D2 = E2 - E1 \quad (7)$$

$$D3 = E3 - E1 \quad (8)$$

Figure 5A:
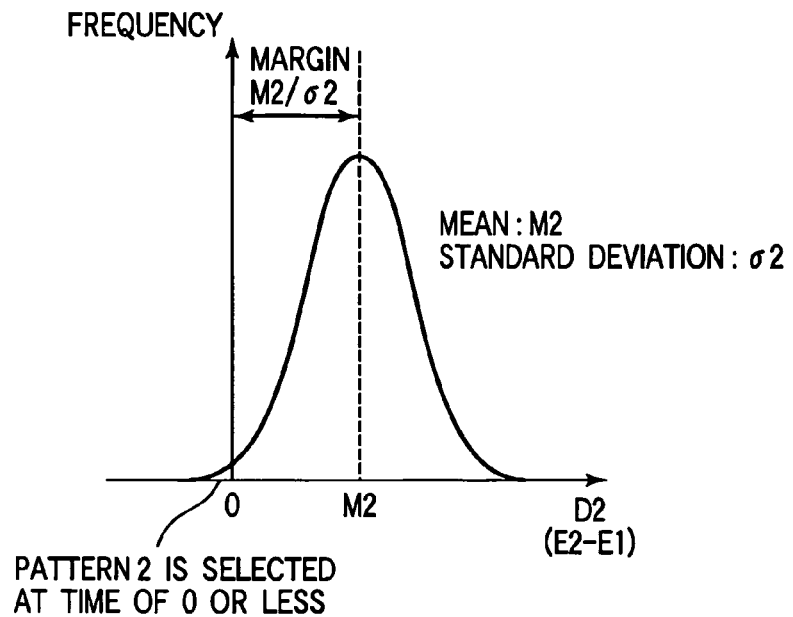
FIGS. 5A and 5B exemplify distributions of Euclidean distance differences (D2=E2−E3; D3=E3−E1) calculated in the structure shown in FIG. 1.
Figure 5B:
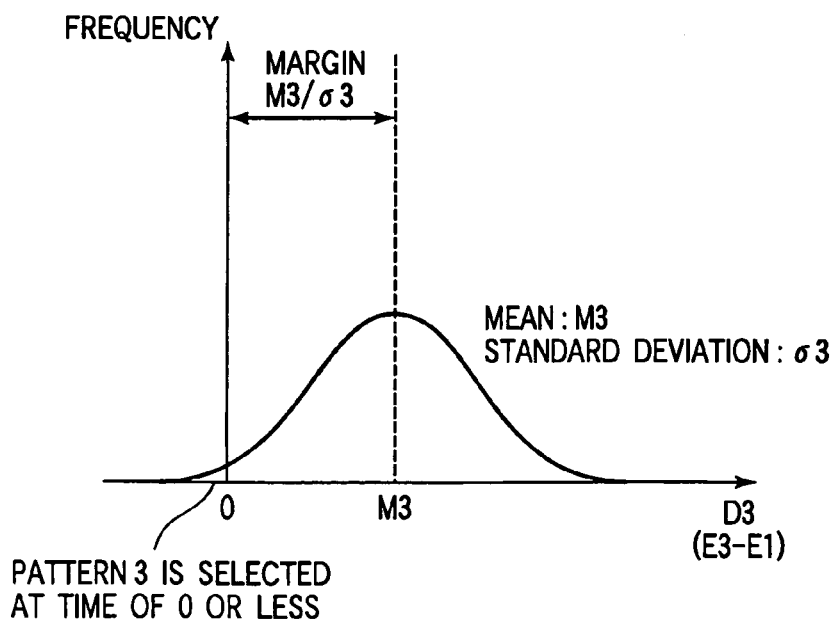

FIGS. 5A and 5B exemplify distributions of Euclidean distance differences (D2=E2−E3; D3=E3−E1) calculated in the structure shown in FIG. 1. In FIGS. 5A and 5B, regions where distributions of Euclidean distance differences D2 and D3 are 0 or less correspond to errors.

Assume that mean values of Euclidean distance differences D2 and D3 are M2 and M3 and standard deviations of distance differences D2 and D3 are σ2 and σ3. Then, a margin Mgn2, with which a discrimination result of the reproduction signal does not become pattern 2 when pattern 1 is recorded, is expressed by $$Mgn2 = M2/\sigma2 \quad (9)$$

Similarly, a margin Mgn3, with which a discrimination result of the reproduction signal does not become pattern 3 when pattern 1 is recorded, is expressed by $$Mgn3 = M3/\sigma3 \tag{10}$$

An event that when pattern 1 is recorded, the discrimination result of the reproduction signal is pattern 2 (i.e. an event that pattern 2 is erroneously recognized for pattern 1) is considered to contradict an event when pattern 1 is recorded, the discrimination result of the reproduction signal is pattern 3 (i.e. an event that pattern 3 is erroneously recognized for pattern 1).

Figure 6:
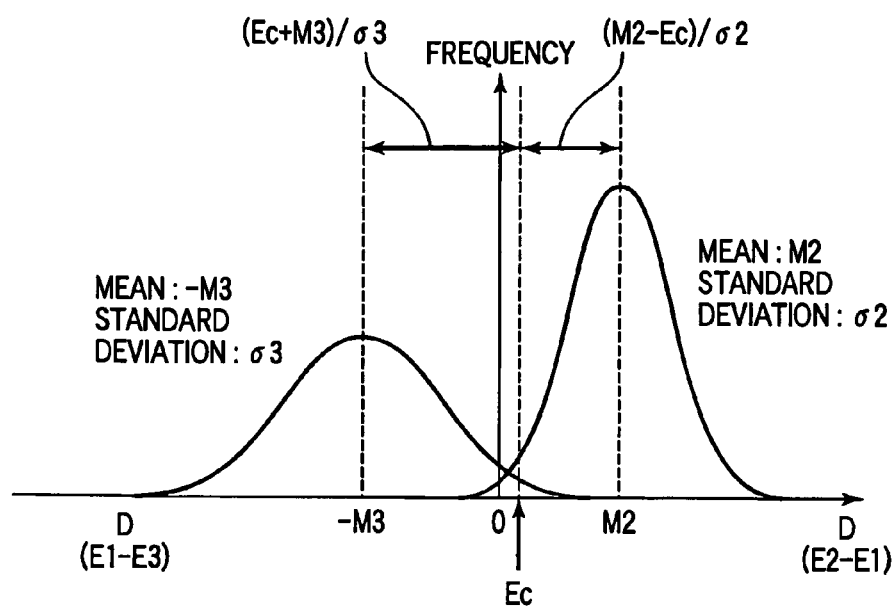
FIG. 6 illustrates an Euclidean distance correction amount based on Euclidean distance differences (D2=E2−E3; −D3=E1−E3) calculated in the structure shown in FIG. 1.

FIG. 6 illustrates an Euclidean distance correction amount based on Euclidean distance differences (D2=E2−E3; −D3=E1−E3) calculated in the structure shown in FIG. 1.

FIG. 6 shows distributions of Euclidean distance differences D2 and −D3. In FIG. 6, the abscissa indicates a value Ec (a record compensation parameter to be described later). Margins Mgn2' and Mgn3' of distance difference distributions D2 and −D3 up to the set value Ec are given by $$Mgn2' = (M2 - Ec)/\sigma2 \tag{11}$$

$$Mgn3' = (M3 - Ec)/\sigma3 \tag{12}$$

Assuming that equations (11) and (12) are equal (i.e. margins Mgn2' and Mgn3' are equal), Ec is given by $$Ec = (\sigma3 * M2 - \sigma2 * M3)/(\sigma2 + \sigma3) \tag{13}$$

If the distributions in FIG. 6 (distance difference distributions D2 and −D3) are generally shifted by Ec obtained by equation (13) (that is, if the origin "0" in the ordinate in FIG. 6 is shifted to the right to the set position of record compensation parameter Ec), the probability that the discrimination result of the reproduction signal is pattern 2 when pattern 1 is recorded becomes equal to the probability that the discrimination result of the reproduction signal is pattern 3 when pattern 1 is recorded. This state corresponds to a least errable state.

Specifically, a waveform compensation amount WC corresponding to the record compensation parameter Ec (or a record compensation parameter Ec' to be described later) is generated by the parameter calculator 224 shown in FIG. 1. The generated compensation parameter WC is delivered to the record waveform generator 230. Thus, record compensation is performed such that "the probability that the discrimination result of the reproduction signal is pattern 2 when pattern 1 is recorded becomes equal to the probability that the discrimination result of the reproduction signal is pattern 3 when pattern 1 is recorded." Thereby, a least errable state is obtained for reading of the reproduction signal relative to the recorded information. Therefore, good recording/reproduction can be performed, for example, on a high-density optical disk for which a blue light laser is used.

The sign of the record compensation parameter Ec corresponds to an increase/decrease in size of the record mark. The absolute value of Ec corresponds to a variation in record mark size. In the example of FIG. 6, the sign of record compensation parameter Ec represents whether the position of Ec is to be set on the right side or left side of origin "0". The absolute value of Ec represents how much the set position of Ec deviates from the origin "0".

The unit of record compensation parameter Ec is a Euclidean distance. Since the bit train length of the ideal signal is "7", the Euclidean distance (Ec) can be converted to an amplitude (Vc) as follows:

$$Vc = \sqrt{(Ec/7)} \tag{14}$$

Alternatively, since the restriction length of the used PR characteristics is "4", the amplitude may be given by $$Vc = \sqrt{(Ec/4)} \tag{15}$$

In order to obtain the compensation amount WC of record pulses E230, it is necessary to find a time compensation amount from the amplitude compensation value Vc expressed by equation (14) or (15) and then to find a pulse compensation amount. However, since this two-step conversion varies depending on the recording medium characteristics as well as the mark length and space length, it is not easy to find a conversion equation to find WC from Vc.

However, based on Ec (or Ec' to be described later) of equation (13) or Vc of equation (14) or (15), record compensation can easily be performed in the following manner. For example, when a record compensation amount is found from Ec (or Ec' to be described later), a dead zone is provided near origin "0" in FIG. 6. If Ec (or Ec' to be described later) is in the dead zone, the record compensation amount WC for the next time is determined to be unchanged. If Ec (or Ec' to be described later) is greater than the dead zone, the record compensation amount for the next time is +1. If Ec (or Ec' to be described later) is less than the dead zone, the record compensation amount for the next time is −1. In accordance with the increase/decrease/no-change [−1, 0, +1] of the found record compensation amount (WC), the width of the first pulse of the record waveform E230, as exemplified in FIG. 7C, is increased/decreased. Thereby, the record waveform E230 can be compensated.

The width (size) of the dead zone and the magnitude of the ± step (the degree of change of WC per step) may be determined by tests using an actual apparatus.

The method of compensating the record waveform E230 is not limited to that of increasing/decreasing the width of the first pulse of record waveform E230. The width of the first pulse, last pulse and/or cooling pulse may be increased or decreased.

Figure 8:
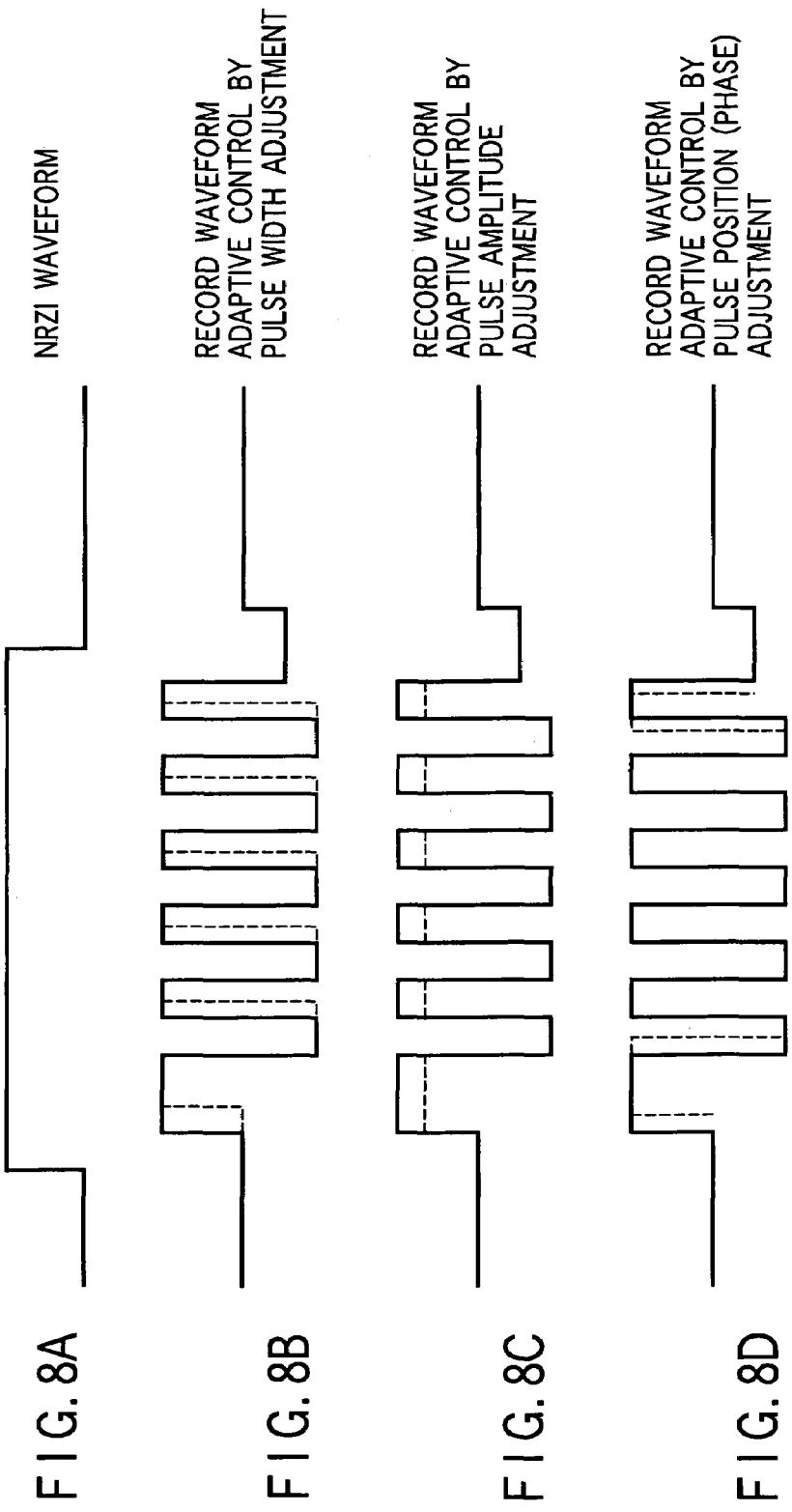
FIGS. 8A to 8D illustrate examples of record waveform compensation methods used in the system of FIG. 1.

The method of altering the record waveform pulse E230 is not limited to a method wherein the pulse width is varied, as exemplified by broken lines in FIG. 8B. Alternatively, either a pulse amplitude variation as shown by broken lines in FIG. 8C or a pulse phase variation as shown by broken lines in FIG. 8D may be adopted. The pulse width variation, pulse amplitude variation and/or pulse phase variation, as shown in FIGS. 8B to 8D, may be properly combined.

In this embodiment, the term "record waveform adaptive control" refers to the control method wherein the pulse width, pulse amplitude and/or pulse phase of the record waveform E230 is varied based on the waveform compensation amount WC such that "the probability that the discrimination result of the reproduction signal is pattern 2 when pattern 1 is recorded becomes equal to the probability that the discrimination result of the reproduction signal is pattern 3 when pattern 1 is recorded", as mentioned above.

Recording/reproduction is performed using the record waveform pulses 230 that have been newly produced by the "record waveform adaptive control". In accordance with the recording/reproduction, the value Ec is calculated by the above method and similar procedures are repeated several times. With the repetition of procedures, the record waveform pulses E230 are optimized (for the individual recording/reproducing system and/or individual optical disks), and good recording/reproduction is ensured.

In the above example, three steps of variations [−1, 0, +1] are provided for the record waveform pulses E230. Alternatively, the range of Ec may be divided more finely into, e.g. 5 steps [−2, −1, 0, +1, +2].

In one possible method, the number of times of repetition of the procedure for calculating record waveform pulses E230 is determined in advance. In another possible method, this procedure is repeated until an evaluation index (Mgn to be described later) indicative of the quality of the reproduction signal reaches a predetermined value.

As the evaluation index indicative of the quality of the reproduction signal, the equation (9) or (10) may be used. The equation (9) or (10) will now be explained in a generalized fashion. Assume that a reproduction signal obtained when some data has been recorded is Y(t), an ideal signal of recorded data is p(t), and an ideal signal of given data other than the recorded data is p'(t). A Euclidean distance Eo between Y(t) and p(t) is given by $$Eo = \Sigma\{Y(t) - p(t)\}^2 \quad (16)$$

Similarly, a Euclidean distance Ee between Y(t) and p'(t) is given by $$Ee = \Sigma\{Y(t) - p'(t)\}^2 \quad (17)$$

From Eo and Ee, a Euclidean distance difference D is found:

$$D = Ee - Eo \quad (18)$$

From a mean value M of the Euclidean distance difference D and a standard deviation σ thereof, an evaluation index Mgn is given:

$$Mgn = M/\sigma \quad (19)$$

The calculation of record waveform pulses E230 is repeated until the evaluation index Mgn of equation (19) reaches a predetermined value or more.

In the first embodiment described with reference to FIG. 1 and other Figures, the length of the mark/space recorded on the optical disk 100 is set at three values, 2T, 3T and ≧4T. Alternatively, the length of the mark/space may be set at four values, 2T, 3T, 4T and ≧5T.

Figure 9:
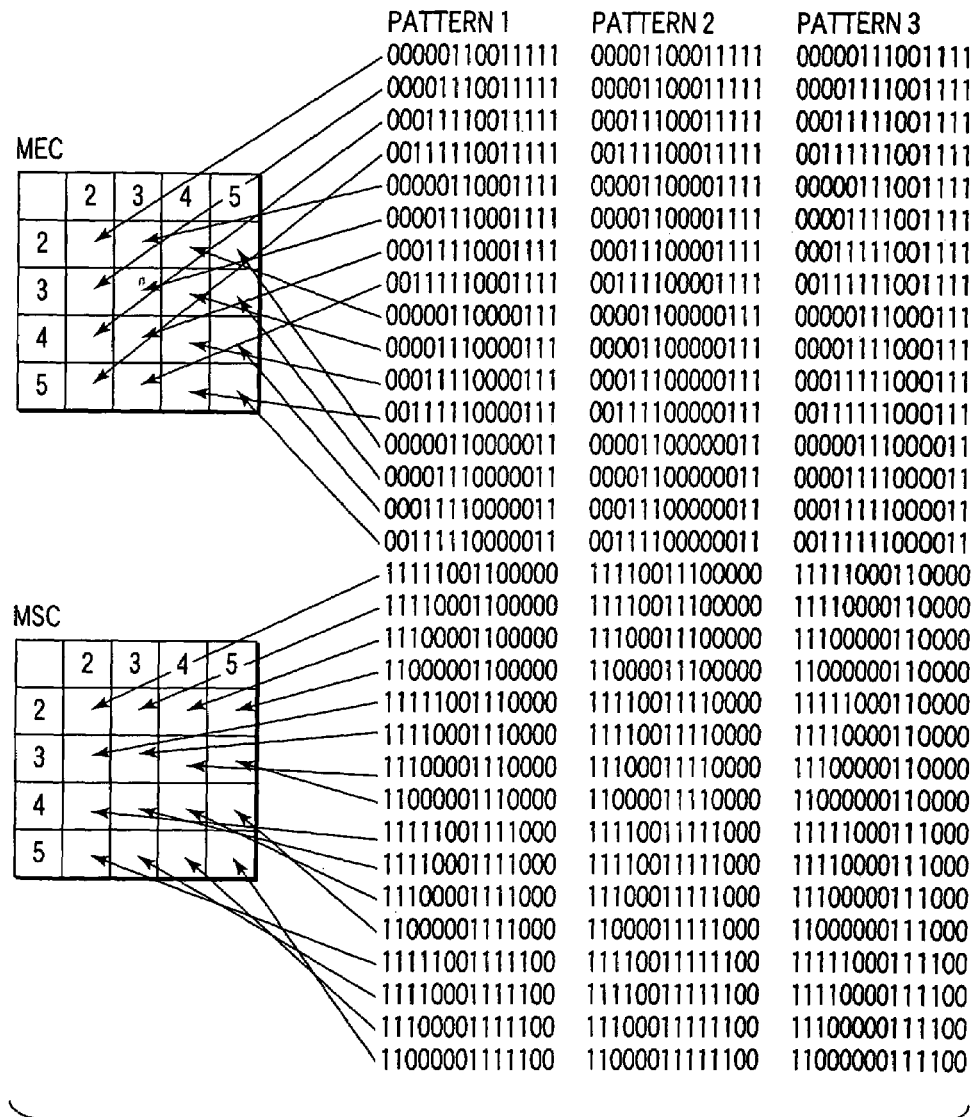
FIG. 9 shows a second example of the relationship between contents of the pattern memory (patterns 1, 2 and 3) and contents of the distance difference memory (for mark rear end control and mark front end control) used in the system of FIG. 1.

FIG. 9 shows a relationship between patterns 1, 2 and 3 and the structure of the distance difference memory 220/222 in the case where the length of the mark/space is set at four values, 2T, 3T, 4T and ≧5T. Except for the number of kinds of patterns (three has increased to four), the record waveform pulses E230 can be obtained in the same procedure as in the first embodiment described with reference to FIG. 1 and other Figures.

According to this embodiment, recording/reproduction can be performed such that a reproduction signal, which is better than in the case of making the reproduction signal E200 coincide with the ideal signal of record data RD, can be obtained.

For example, in the fourth row in FIG. 3, the Euclidean distance between the ideal signals of patterns 1 and 2 is "12" and that between the ideal signals of patterns 1 and 3 is "10". When recording is performed in conformity to the ideal signal of pattern 1 and if white noise is considered as a main factor of degradation in reproduction signal, Mgn2>Mgn3 and Mc<0. That is, recording is performed so that the 2T mark may become smaller.

Even if the 2T mark becomes smaller, if a Viterbi decoder ("240" in FIG. 15, to be described later) is used, a read error for a reproduction signal can be avoided. The feature of the Viterbi decoder that 1T of the rule of modulation code is excluded is advantageously used, and no error occurs even if a 2T signal is relatively small.

Figure 10:
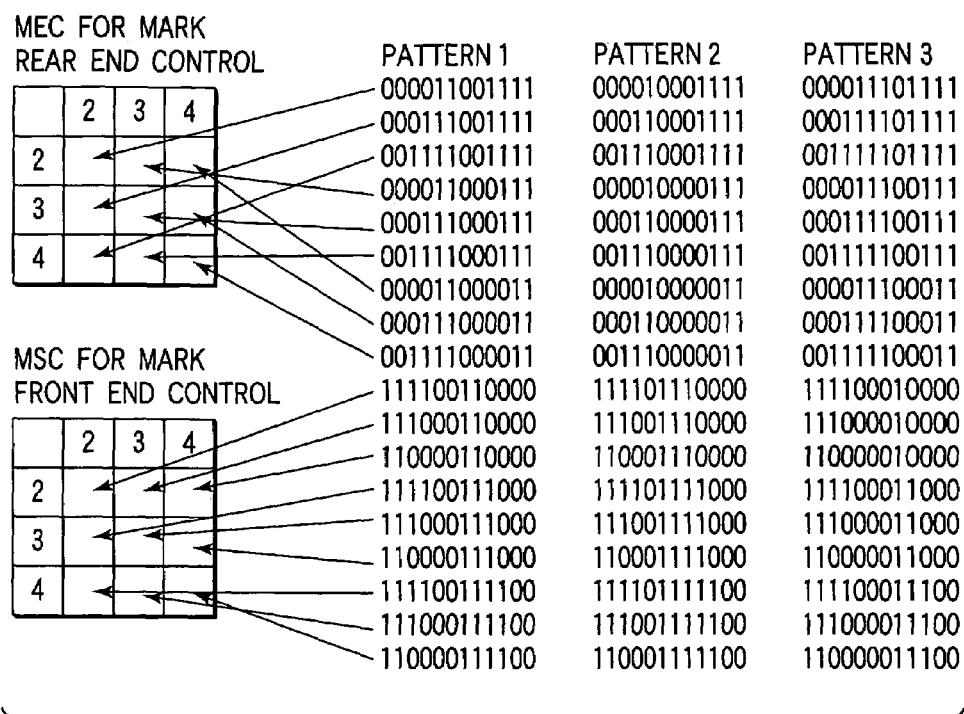
FIG. 10 shows a third example of the relationship between contents of the pattern memory (patterns 1, 2 and 3) and contents of the distance difference memory (for mark rear end control and mark front end control) used in the system of FIG. 1.

However, if the reproduction signal deviates from the ideal signal, other disadvantage may occur. For example, when a timing generator, which extracts a clock signal from the timing of the reproduction signal E200 passing through the center level, is used, the clock precision may degrade in the first embodiment shown in FIG. 1. In such a case, the patterns of FIG. 3 may be replaced with patterns shown in FIG. 10. In the patterns of FIG. 10, 1T signals, which are not actually output from the Viterbi decoder, are applied to patterns 2 and 3. Thereby, the reproduction signal E200 is made closer to the ideal signal. Similarly, the patterns of FIG. 9 may be replaced with patterns of FIG. 11.

Figures 12, 13, 14:
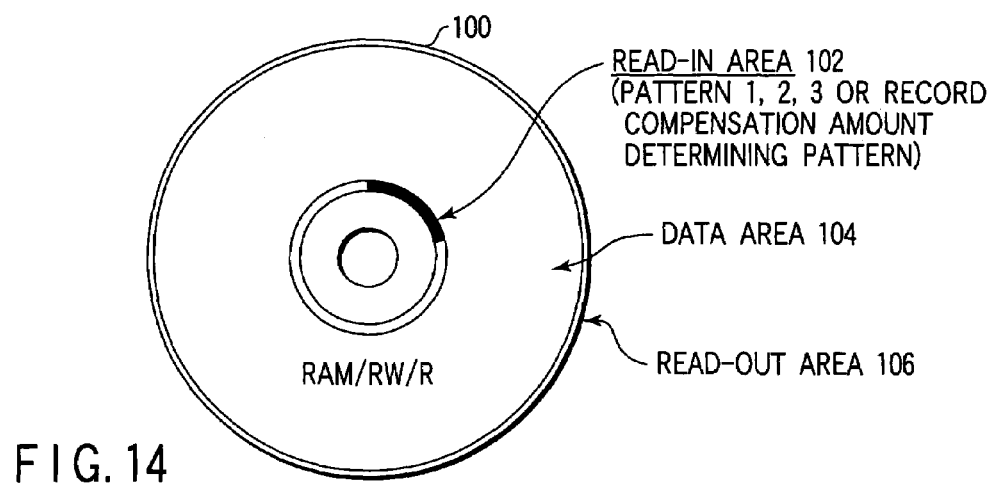
FIG. 12 shows examples of record compensation amount determining patterns when the patterns shown in FIG. 3 or 10 are used.
FIG. 13 shows examples of record compensation amount determining patterns when the patterns shown in FIG. 9 or are is used.
FIG. 14 shows the structure of an optical disk (DVD-RAM, DVD-RW, DVD-R) used as an information recording/reproducing medium in the present invention.

FIG. 12 shows examples of record compensation amount (WC) determining patterns when the patterns shown in FIG. 3 or 10 are used.

In one possible method, random data may be applied to the record compensation amount (WC) determining patterns (record data RD), and pattern 1 may be extracted therefrom. In another possible method, patterns as shown in FIG. 12 may be adopted as record compensation amount (WC) determining patterns. The patterns of FIG. 12 include all patterns 1 in FIG. 2. The arrangement of patterns is devised. A pattern for finding a record compensation amount of an nT mark/mT space is followed by a pattern for finding a record compensation amount of an nT space/mT mark. With this arrangement, a pattern in FIG. 12 in every other row has a DSV (Digital Sum Value) of zero.

Figure 11:
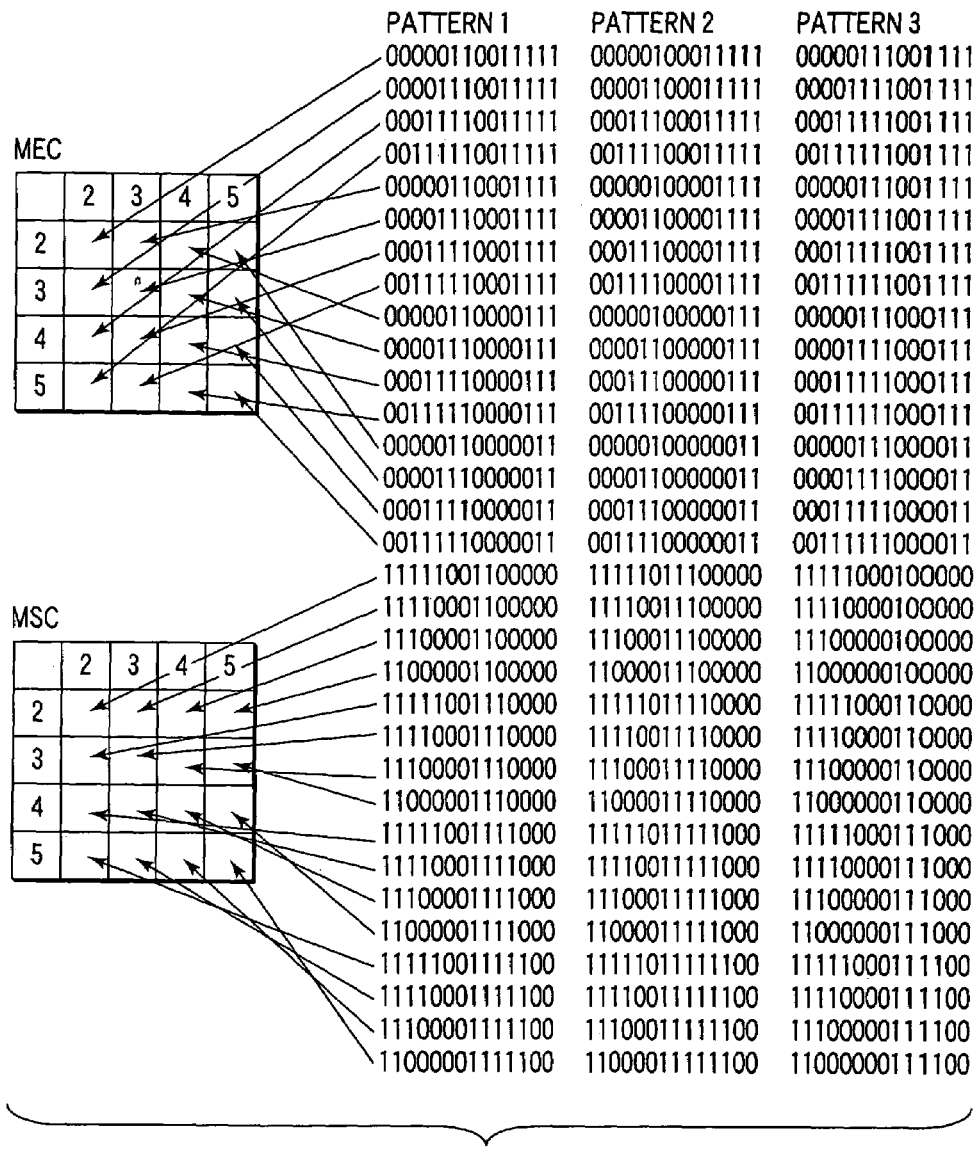
FIG. 11 shows a fourth example of the relationship between contents of the pattern memory (patterns 1, 2 and 3) and contents of the distance difference memory (for mark rear end control and mark front end control) used in the system of FIG. 1.

In addition, FIG. 13 shows examples of record compensation amount (WC) determining patterns when the patterns shown in FIG. 9 are used. Similarly with the case of FIG. 12, record data (RD) for patterns of FIGS. 10 and 11 is provided.

In one possible method, patterns 1, 2 and 3 and record compensation amount (WC) determining patterns may be prestored in the information recording system (apparatus) (210, 212 in FIG. 1). On the other hand, there is a case where these patterns may differ from medium to medium (optical disk 100) for use in recording/reproduction. In another possible method, this is taken into account and patterns 1, 2 and 3 and/or record compensation amount (WC) determining patterns may be prestored on a part of an individual medium, e.g. on a read-in area 102 on the optical disk (see FIG. 14).

If pattern data and/or recording compensation amount data is pre-recorded on an individual information recording medium (recordable/reproducible blank disk), the system (recording/reproducing apparatus, etc.) using the medium can quickly and exactly record/reproduce information with a recording waveform matching with the medium.

Examples of the information recording medium (recordable/reproducible blank disk) are a DVD-RAM, DVD-RW and DVD-R. The location of recording of the pattern data and/or record compensation amount data for optimal recording/reproduction is not limited to the read-in area 102 in FIG. 14. It may be on a specific portion of a data area 104, or on a read-out area 106.

Normally, the read-in area 102 is the proper location for recording pattern data and/or record compensation amount data for optimal recording/reproduction. However, depending on conditions, another location may be better. Assume that the medium is a DVD-R and data has already been recorded on the DVD-R up to a certain portion of the data area 104. In this case, pattern data and/or record compensation amount data for optimal recording/reproduction may be recorded using a small record area X immediately after the portion on which data has been recorded. When new data is to be recorded on the DVD-R, record waveform compensation is performed using the record content in the area X (pattern data and/or record compensation amount data), and the new data can be recorded on a non-recorded area on the DVD-R (from the area X) with the compensated record waveform.

For example, when the medium is of a type having recording layers on both sides and recording on a surface A has completed and recording on a surface B is about to begin, there may be a case where a data record start point is closer to the read-out area 106 than to the read-in area 102. In this case, the pattern data and/or record compensation amount data may better be recorded on the read-out area 106 that permits a shorter seek distance of the PUH 200 (in this case, too, the read-in area 102 may be used as the record area for the pattern data and/or record compensation amount data).

Figure 15:
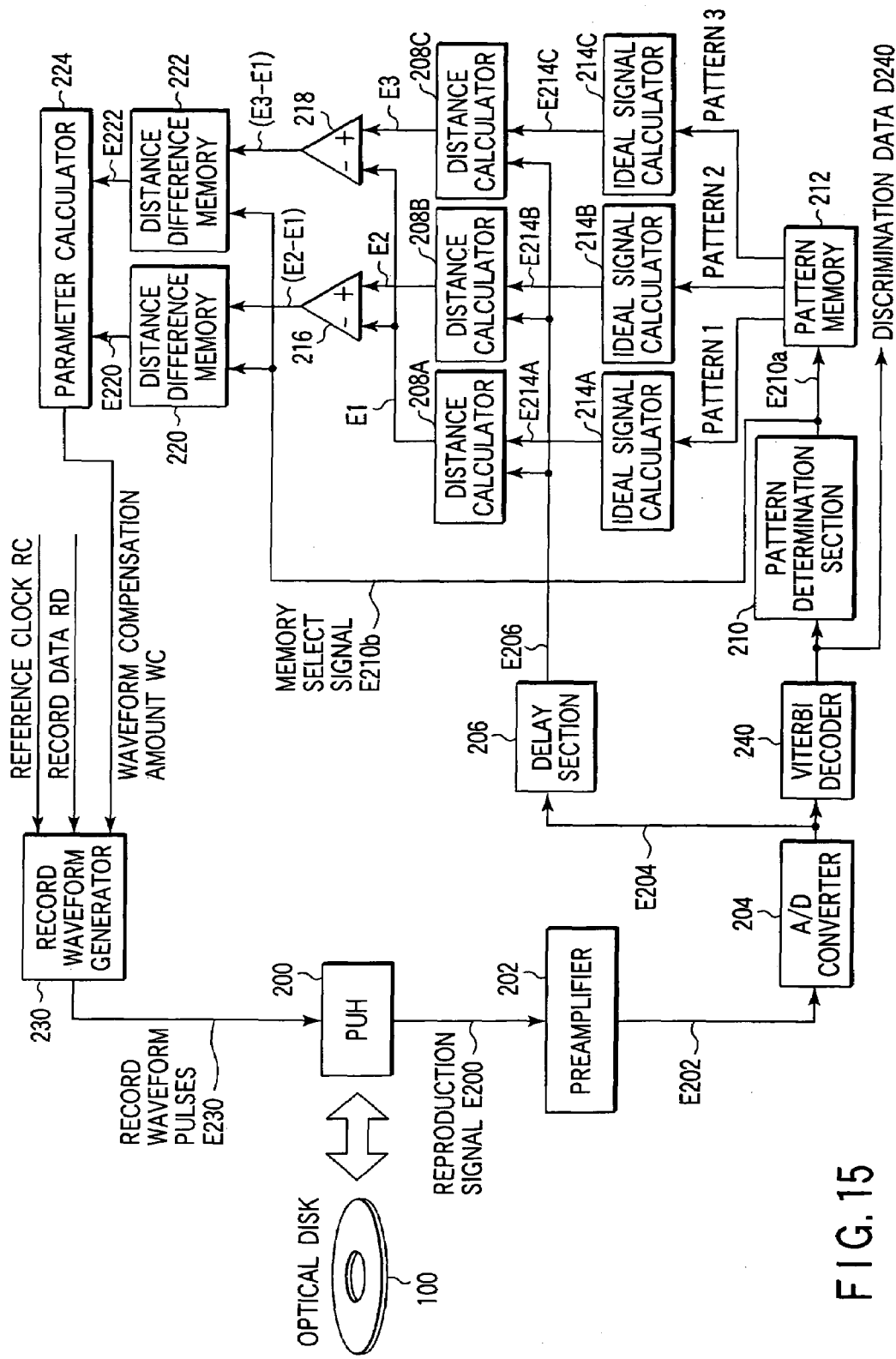
FIG. 15 shows the structure of an information recording/reproducing system according to a second embodiment of the present invention.

FIG. 15 shows the structure of an information recording/reproducing system (apparatus) according to a second embodiment of the present invention. In the second embodiment, a Viterbi decoder 240 is added to the structure of the first embodiment shown in FIG. 1. In other words, in the embodiment of FIG. 15, not the record data RD but a discrimination result D240 produced from the Viterbi decoder 240 is used as an input to the pattern determination section 210. When the Viterbi discrimination result D240 is used, sub-zero portions of the distributions shown in FIGS. 5A and 5B will disappear and a calculation error may occur at the time of finding the record waveform pulses E230. However, when phase adjustment between record data RD and reproduction signal E200 is difficult, the use of Viterbi decoder 240 as in the embodiment of FIG. 15 is effective.

For example, in equations (2) to (4), the Euclidean distance Ea is calculated by "$Ea=\Sigma\{Y(t)-Px(t)\}^2$" (an accumulated value of magnitude is obtained by squaring). However, other information corresponding to Ea may be calculated by "$Eb=\Sigma|Y(t)-Py(t)|$" (an accumulated value of magnitude is obtained by finding an absolute value).

Referring now to FIGS. 16 to 24, a description will be given of third and forth embodiments as applied examples of the above-described first and second embodiments. Those portions of the third and fourth embodiments, which overlap the first and second embodiments, will be omitted.

Figure 16:
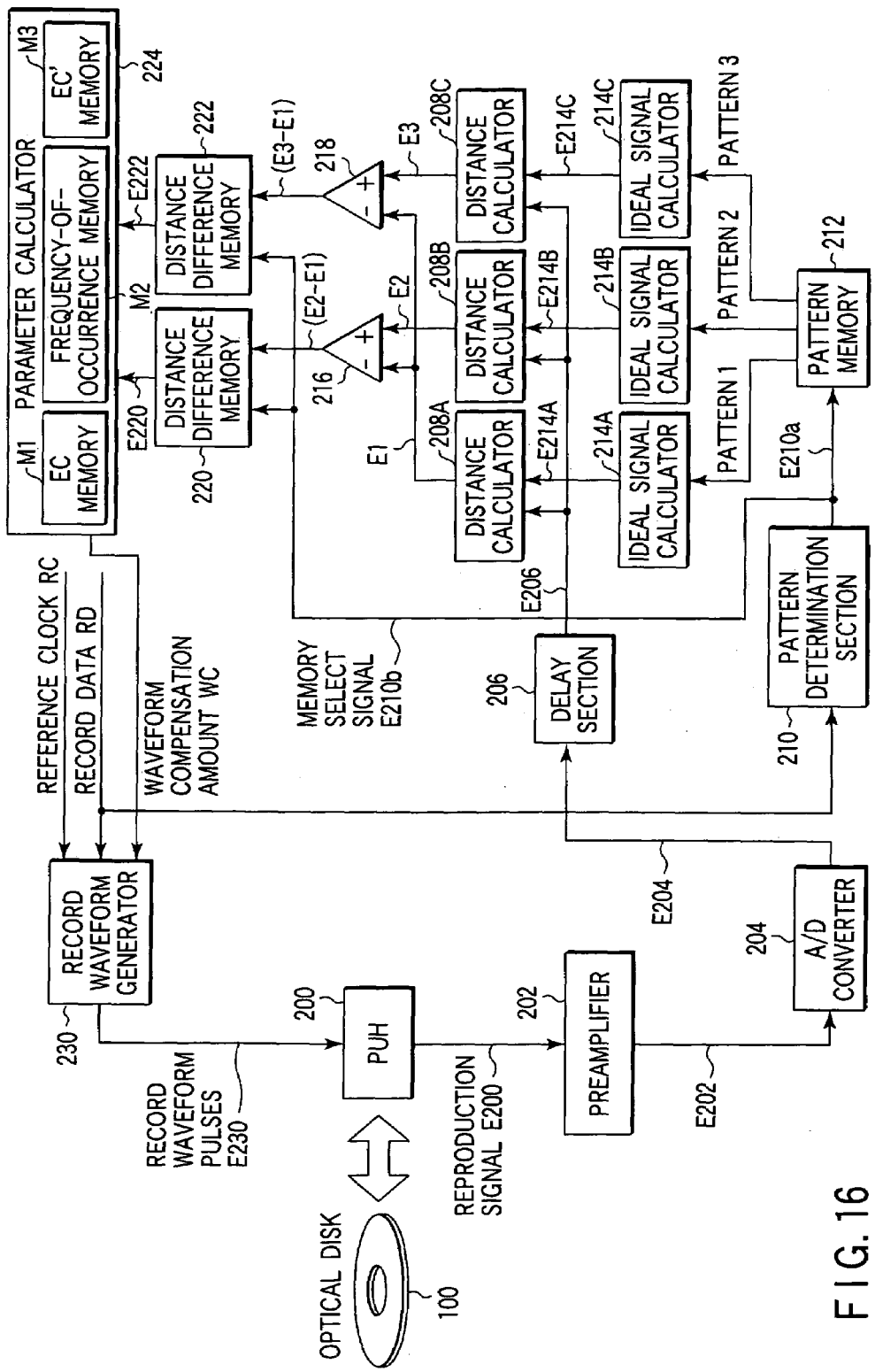
FIG. 16 shows the structure of an information recording/reproducing system according to a third embodiment of the present invention.

FIG. 16 illustrates the structure of an information recording/reproducing system (third embodiment) according to an embodiment of the invention. The basic structure of the information recording/reproducing system shown in FIG. 16 is the same as that of the information recording/reproducing system shown in FIG. 1, and a detailed description thereof is omitted.

The structure of the ideal signal calculator 214 (214A–214C) of the information recording/reproducing system shown in FIG. 16 is as shown in FIG. 2, and a detailed description thereof is omitted.

The distributions of Euclidean distance differences (D2=E2–E3; D3=E3–E1) calculated in the information recording/reproducing system shown in FIG. 16 are as shown in FIGS. 5A and 5B, and a detailed description thereof is omitted.

An Euclidean distance correction amount based on Euclidean distance differences (D2=E2–E3; –D3=E1–E3) calculated in the information recording/reproducing system shown in FIG. 16 is illustrated as shown in FIG. 6, and a detailed description thereof is omitted.

Examples of record waveform pulses used in the information recording/reproducing system of FIG. 16 are illustrated as shown in FIGS. 7A to 7C, and a detailed description thereof is omitted.

Examples of record waveform compensation methods used in the information recording/reproducing system of FIG. 16 are illustrated in FIGS. 8A to 8D, and a detailed description thereof is omitted.

Figure 17:
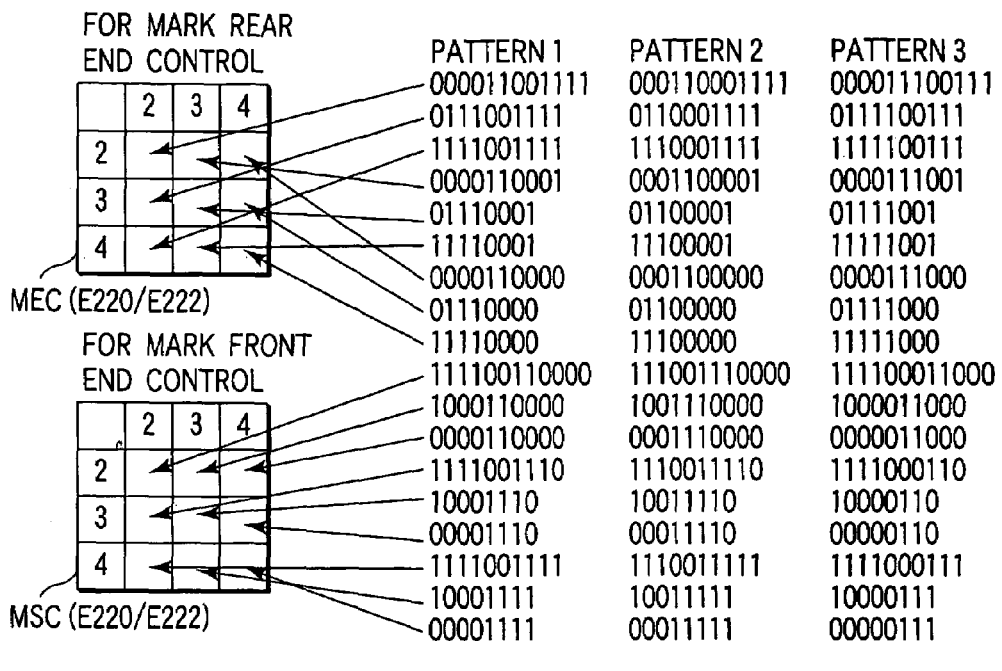
FIG. 17 shows a first example of the relationship between contents of a pattern memory (patterns 1, 2 and 3) and contents of a distance difference memory (for mark rear end control and mark front end control) used in the system of FIG. 16.
Figure 18:
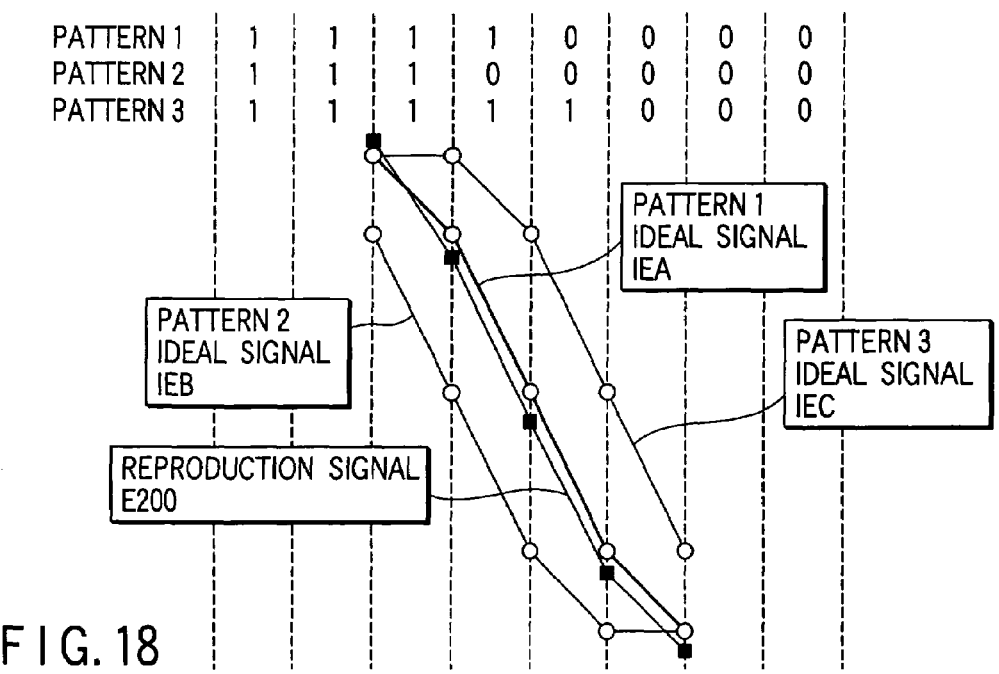
FIG. 18 shows a relationship between a reproduced signal (E200) and an ideal signal (IEA, IEB, IEC) in the structure shown in FIG. 16.

FIG. 17 shows a first example of the relationship between contents of the pattern memory 212 (patterns 1, 2 and 3) and contents of the distance difference memory 220 (222) (for mark rear end control and mark front end control) used in the system (apparatus) of FIG. 16.

For example, the first row of each of patterns 1, 2 and 3, shown in the right part of FIG. 17, indicates a pattern for recording a 2T mark/2T space. A result (MEC) calculated using the first-row pattern is stored at an address indicated by an arrow in the distance difference memory 220/222 for mark rear end control.

Examples of the method of selecting patterns 2 and 3 will now be described. Pattern 2 is a pattern with a minimum Euclidean distance from an ideal signal (IEA in FIG. 18 (to be described later)) of pattern 1, under the condition that pattern 2 has bits "00" (or "11") corresponding to middle bits "10" (or "01") in the bit train of pattern 1, and the condition that the rule of the modulation code (RLL(1,7), etc.) is satisfied. Pattern 3 is a pattern with a minimum Euclidean distance from an ideal signal (IEA in FIG. 18) of pattern 1, under the condition that pattern 3 has bits "11" (or "00") corresponding to middle bits "10" (or "01") in the bit train of pattern 1, and the condition that the rule of the modulation code (RLL(1,7), etc.) is satisfied.

When two bit trains with the same length are expressed as PA(n) and PB(n) (n=0–N), the Euclidean distance is given by equation (1).

The Euclidean distance will be described by giving some examples. In the second row in FIG. 17, pattern 1 is "0111001111" and pattern 2 is "0110001111". The sole difference between patterns 1 and 2 is the "1" or "0" at the fourth bit.

The ideal signal (IEA in FIG. 18) of pattern 1 is "5532356" and the ideal signal (IEB in FIG. 18) of pattern 2 is "4311356". The Euclidean distance between the two bit trains is "10". In this case, a pattern having a length of 10 bits and the fourth bit "0", and the Euclidean distance of "10" or less between the deal signal thereof and the deal signal of pattern 1 is only "0110001111". Thus, "0110001111" is adopted as pattern 2.

Referring to the second row of pattern 3 in FIG. 17, "0111100111" is adopted. A pattern formed by replacing the fifth bit "0" of pattern 1 with "1" is "0111101111". The Euclidean distance between the ideal signal "5654456" of pattern "0111101111" and the ideal signal "5532356 " of pattern 1 is "10". In this case, a pattern having a length of 10 bits and the fifth bit "1" and the Euclidean distance of "10" or less between the deal signal thereof and the deal signal of pattern 1 is only "0111101111".

However, the pattern "0111101111" includes a bit train "101" and violates the rule of modulation code (RLL(1,7)). Thus, "0111101111" cannot be adopted as pattern 3. The pattern, which can be adopted as pattern 3, is "0111100111" that meets the rule of modulation code (RLL(1,7)).

The Euclidean distance between the ideal signal "5653235" of pattern "0111100111" and the ideal signal "5532356" of pattern 1 is "12". In this case, a pattern, which meets the rule of modulation code (RLL(1,7)) and has a length of 10 bits and the fifth bit "1", and the Euclidean distance of "12" or less between the deal signal thereof and the deal signal of pattern 1, is only "0111100111". Thus, "0111100111" is adopted as pattern 3.

The basic concept of the method of calculating the record compensation amount in the third and fourth embodiments is the same as that of the method in the first and second embodiments, and a detailed description thereof is omitted.

The record compensation amount to be described here is calculated by the parameter calculator 224 functioning as arithmetic means, conversion means and compensation means. Specifically, distributions and standard deviations to be described later are calculated by the parameter calculator 224. In addition, the conversion from the record compensation amount Ec to record compensation amount Ec' based on the frequency of occurrence is effected by the parameter calculator 224. Moreover, the waveform compensation amount WC, to be described later, is calculated by the parameter calculator 224.

As has been described in connection with the first and second embodiments, when the record compensation amount (Ec) has been determined, the DC level varies before and after the record compensation. In some cases, execution of compensation of a certain pattern may lead to a variation in DC level and require record compensation of the other patterns. As a result, it is possible that convergence cannot be reached no matter how many times the record compensation is performed.

In order to prevent a variation in DC level before and after the recored compensation, the following technique may be adopted. As is shown in FIG. 19, there are provided an Ec memory M1 that stores Ec calculated for each pattern, a frequency-of-occurrence memory M2 that stores the frequency of occurrence of each pattern, and an Ec' memory M3 which stores Ec' that has been obtained by correcting Ec such that the DC level may not vary.

Specifically, as shown in FIG. 16, the parameter calculator 224 is provided with the Ec memory M1, frequency-of-occurrence memory M2 and Ec' memory M3. The parameter calculator 224 supplies the waveform compensation amount WC corresponding to the record compensation parameter Ec' to the record waveform generator 230.

Values $\alpha, \beta, \ldots \rho$ stored in the frequency-of-occurrence memory represents the frequency of occurrence of each pattern, and $\alpha+\beta+\ldots+\rho=1$. The frequency of occurrence is calculated based on the result of the pattern determination section 210, using a counter. The frequency of occurrence may be calculated in advance from the properties of the modulation codes The values (a', b', ..., r') stored in the Ec' memory M3 can be calculated as follows.

$$a'=a-\{a\alpha+b\beta+\ldots+r\rho\}$$

$$b'=b-\{a\alpha+b\beta+\ldots+r\rho\}$$

...

$$r'=r-\{a\alpha+b\beta+\ldots+r\rho\} \quad (20)$$

Equation (20) expresses the result obtained by subtracting an average value, which is found in consideration of the frequency of occurrence, from each value of a, b, ... c. Accordingly, $a'\alpha+b'\beta+\ldots+r'\rho=0$.

The above method is a method wherein DC components of the mark front end and mark rear end combined. There is a case where the record compensation system becomes stable if the DC component is set at 0 with respect to only the mark front end or the mark rear end.

In this case, assuming $\alpha+\beta+\ldots+\iota=1, \phi+\kappa+\ldots+\rho=1$, the values a', b', ..., r' are given by $$a'=a-\{a\alpha+b\beta+\ldots+i\iota\}$$

$$b'=b-\{a\alpha+b\beta+\ldots+i\iota\}$$

...

$$i'=i-\{a\alpha+b\beta+\ldots+i\iota\} \quad (21)$$

$$j'=j-\{a\alpha+b\beta+\ldots+i\rho\}$$

$$k'=k-\{a\alpha+b\beta+\ldots+i\rho\}$$

...

$$r'=r-\{a\alpha+b\beta+\ldots+i\rho\} \quad (22)$$

Figure 24:
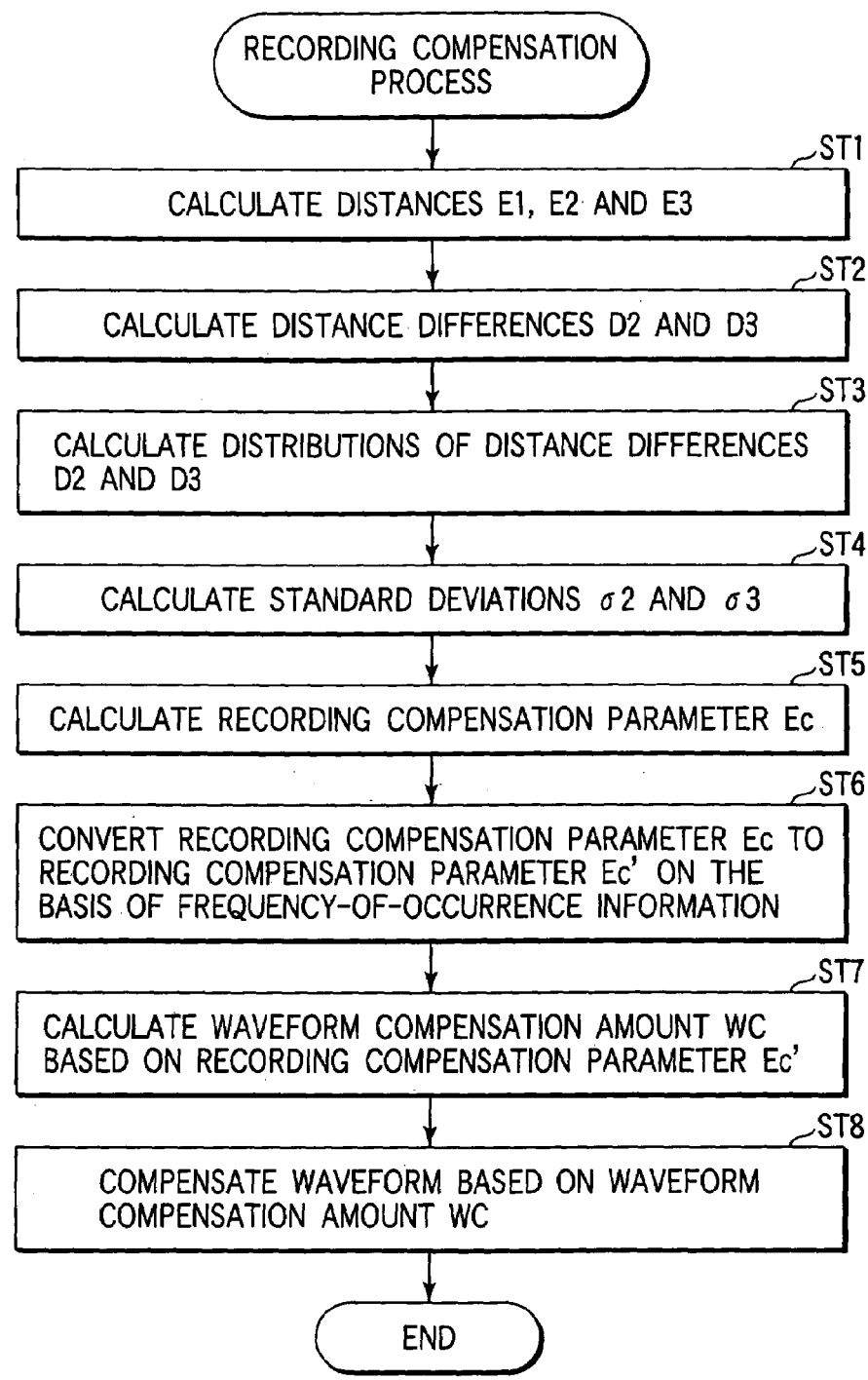
FIG. 24 is a flowchart for explaining a recording compensation method.

Referring now to the flow chart of FIG. 24, the above-described recording compensation method is summarized. To start with, the following are defined: a predetermined reproduction signal, a first pattern corresponding to the signal waveform pattern of this reproduction signal, a second pattern that is other than the first pattern and corresponds to the signal waveform pattern of the reproduction signal, and a third pattern that is other than the first and second patterns and corresponds to the signal waveform pattern of the reproduction signal.

A first distance E1 between the reproduction signal and the first pattern, a second distance E2 between the reproduction signal and the second pattern and a third distance E3 between the reproduction signal and the third pattern are calculated by the parameter calculator 224 (ST1). Subsequently, a first distance difference D2=E2−E1 between the first distance E1 and second distance E2, and a second distance difference D3=E3−E1 between the first distance E1 and third distance E3 are calculated by the parameter calculator 224 (ST2). Then, with respect to a plurality of samples of the reproduction signal, a distribution of the first distance difference D2 and a distribution of the second distance difference D3 are calculated by the parameter calculator 224 (ST3). A mean value M2 of the first distance difference D2 and a standard deviation $\sigma2$ of the distribution of the first distance difference D2, and a mean value M3 of the second distance difference D3 and a standard deviation $\sigma3$ of the distribution of the second distance difference D3 are calculated by the parameter calculator 224 (ST4).

Next, based on the relationship, $(\sigma2*M3+\sigma3*M2)/(\sigma2+\sigma3)$, the recording compensation parameter Ec is calculated by the parameter calculator 224 (ST5), and the calculated recording compensation parameter Ec is stored in the Ec memory M1. Subsequently, based on the frequency-of-occurrence information stored in the frequency-of-occurrence memory M2, the recording compensation parameter Ec stored in the Ec memory M1 is converted to the recording compensation parameter Ec' (ST6), and the converted recording compensation parameter Ec' is stored in the Ec' memory M3.

At last, based on the recording compensation parameter Ec' stored in the Ec' memory M3, the waveform compensation amount WC for compensating the signal record waveform for the information recording medium is calculated (ST7), the the signal record waveform is compensated based on the waveform compensation amount WC (ST8).

In the third embodiment described with reference to FIG. 16 and other Figures, the length of the mark/space recorded on the optical disk 100 is set at three values, 2T, 3T and $\geq$4T. Alternatively, the length of the mark/space may be set at four values, 2T, 3T, 4T and $\geq$5T.

Figure 20:
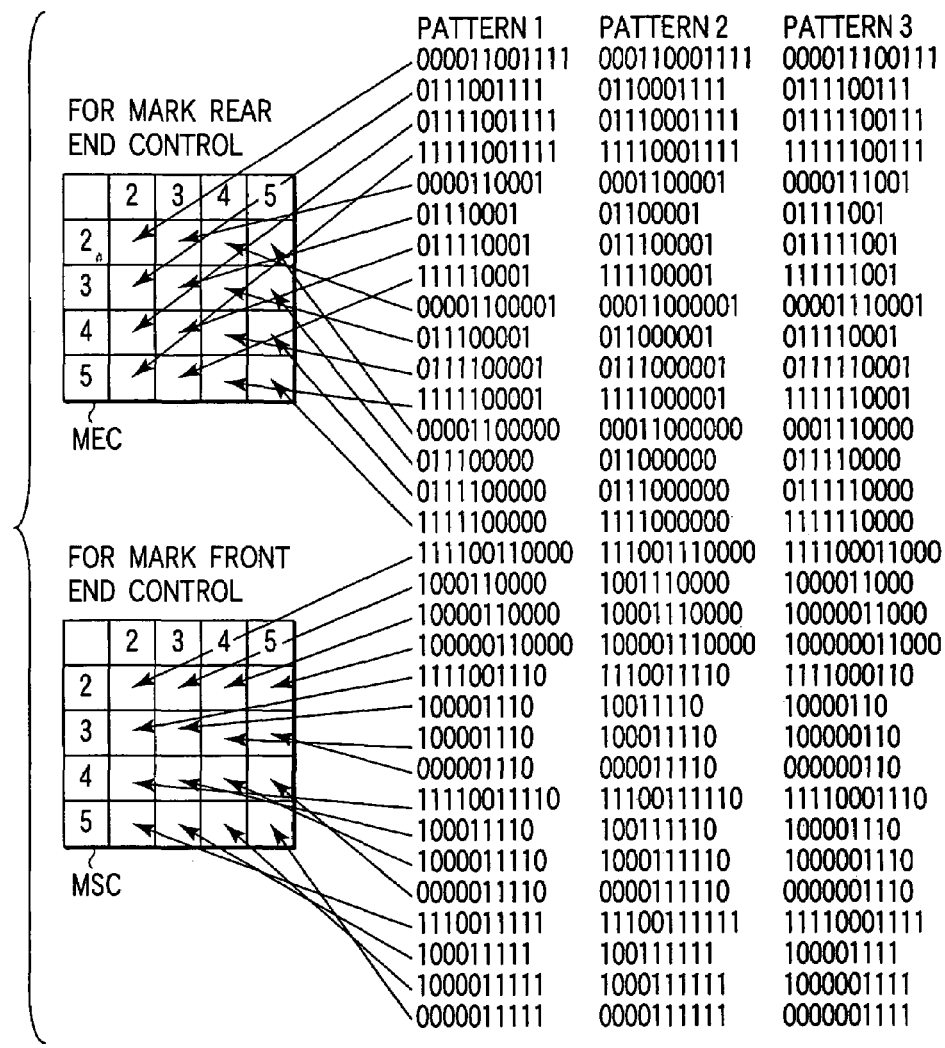
FIG. 20 shows a second example of the relationship between contents of the pattern memory (patterns 1, 2 and 3) and contents of the distance difference memory (for mark rear end control and mark front end control) used in the system of FIG. 16.

FIG. 20 shows a relationship between patterns 1, 2 and 3 and the structure of the distance difference memory 220/222 in the case where the length of the mark/space is set at four values, 2T, 3T, 4T and $\geq$5T. Except for the number of kinds of patterns (three has increased to four), the record waveform pulses E230 can be obtained in the same procedure as in the third embodiment described with reference to FIG. 16 and other Figures.

According to this embodiment, recording/reproduction can be performed such that a reproduction signal, which is better than in the case of making the reproduction signal E200 coincide with the ideal signal of record data RD, can be obtained.

For example, in the fourth row in FIG. 17, the Euclidean distance between the ideal signals of patterns 1 and 2 is "12" and that between the ideal signals of patterns 1 and 3 is "10". When recording is performed in conformity to the ideal signal of pattern 1 and if white noise is considered as a main factor of degradation in reproduction signal, Mgn2>Mgn3 and Mc<0. That is, recording is performed so that the 2T mark may become smaller.

Even if the 2T mark becomes smaller, if a Viterbi decoder ("240" in FIG. 23, to be described later) is used, a read error for a reproduction signal can be avoided. The feature of the Viterbi decoder that 1T of the rule of modulation code is excluded is advantageously used, and no error occurs even if a 2T signal is relatively small.

Figure 21:
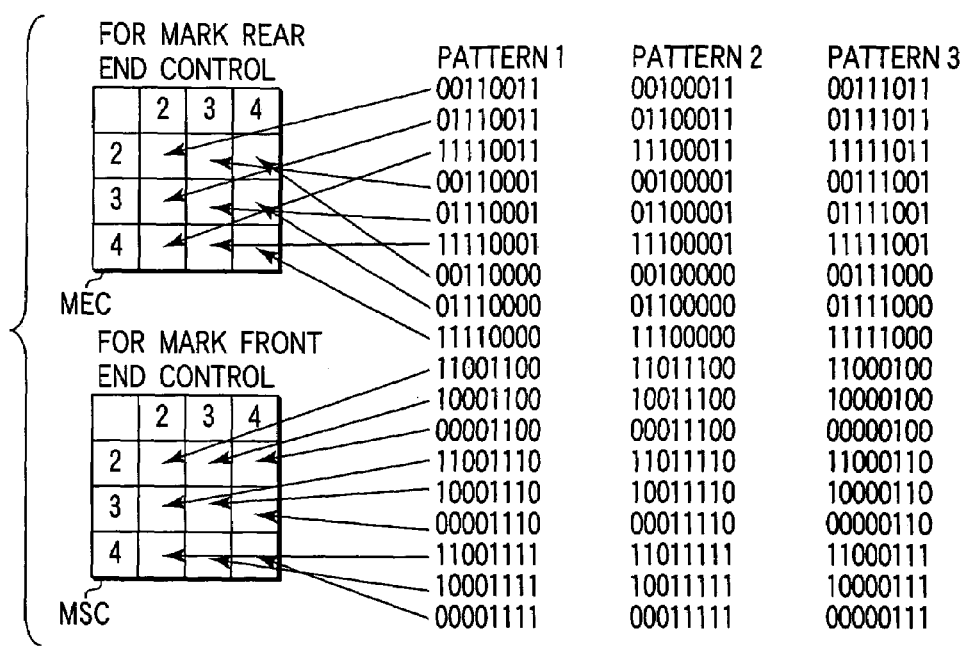
FIG. 21 shows a third example of the relationship between contents of the pattern memory (patterns 1, 2 and 3) and contents of the distance difference memory (for mark rear end control and mark front end control) used in the system of FIG. 16.
Figure 22:
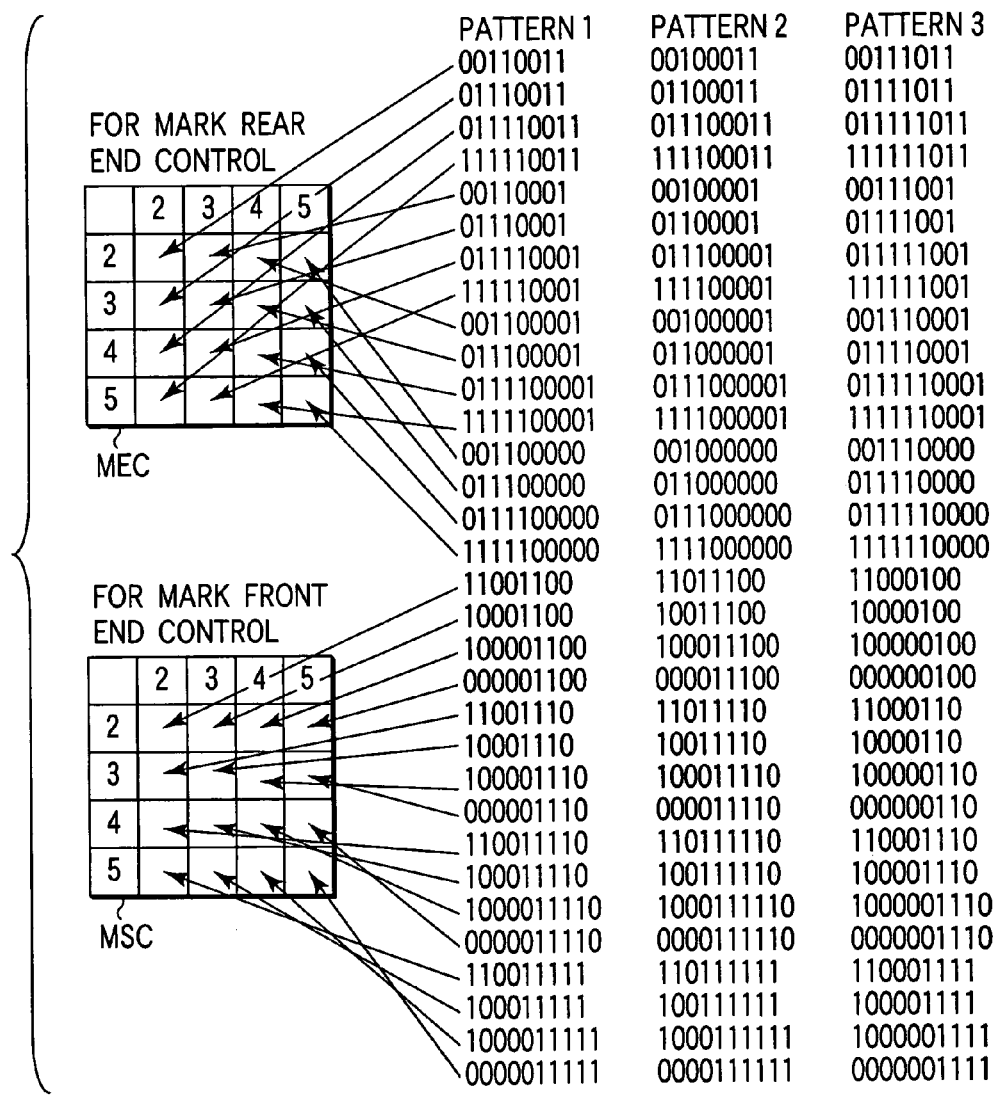
FIG. 22 shows a fourth example of the relationship between contents of the pattern memory (patterns 1, 2 and 3) and contents of the distance difference memory (for mark rear end control and mark front end control) used in the system of FIG. 16.

However, if the reproduction signal deviates from the ideal signal, other disadvantage may occur. For example, when a timing generator, which extracts a clock signal from the timing of the reproduction signal E200 passing through the center level, is used, the clock precision may degrade in the third embodiment shown in FIG. 16. In such a case, the patterns of FIG. 17 may be replaced with patterns shown in FIG. 21. In the patterns of FIG. 21, 1T signals, which are not actually output from the Viterbi decoder, are applied to patterns 2 and 3. Thereby, the reproduction signal E200 is made closer to the ideal signal. Similarly, the patterns of FIG. 20 may be replaced with patterns of FIG. 22.

In one possible method, random data may be applied to the record compensation amount (WC) determining patterns (record data RD), and pattern 1 may be extracted therefrom.

In one possible method, record compensation amount (WC) determining patterns may be prestored in the information recording system (210, 212 in FIG. 16). On the other hand, there is a case where these patterns may differ from medium to medium (optical disk 100) for use in recording/reproduction. In another possible method, this is taken into account and patterns 1, 2 and 3 and/or record compensation amount (WC) determining patterns may be prestored on a part of an individual medium, e.g. on a read-in area 102 on the optical disk (see FIG. 14).

If pattern data and/or recording compensation amount data is pre-recorded on an individual information recording medium (recordable/reproducible blank disk), the system (recording/reproducing apparatus, etc.) using the medium can quickly and exactly record/reproduce information with a recording waveform matching with the medium.

Examples of the information recording medium (recordable/reproducible blank disk) are a DVD-RAM, DVD-RW and DVD-R. The location of recording of the pattern data and/or record compensation amount data for optimal recording/reproduction is not limited to the read-in area 102 in FIG. 14. It may be on a specific portion of a data area 104, or on a read-out area 106.

Normally, the read-in area 102 is the proper location for recording pattern data and/or record compensation amount data for optimal recording/reproduction. However, depending on conditions, another location may be better. Assume that the medium is a DVD-R and data has already been recorded on the DVD-R up to a certain portion of the data area 104. In this case, pattern data and/or record compensation amount data for optimal recording/reproduction may be recorded using a small record area X immediately after the portion on which data has been recorded. When new data is to be recorded on the DVD-R, record waveform compensation is performed using the record content in the area X (pattern data and/or record compensation amount data), and the new data can be recorded on a non-recorded area on the DVD-R (from the area X) with the compensated record waveform.

For example, when the medium is of a type having recording layers on both sides and recording on a surface A has completed and recording on a surface B is about to begin, there may be a case where a data record start point is closer to the read-out area 106 than to the read-in area 102. In this case, the pattern data and/or record compensation amount data may better be recorded on the read-out area 106 that permits a shorter seek distance of the PUH 200 (in this case, too, the read-in area 102 may be used as the record area for the pattern data and/or record compensation amount data).

FIG. 23 shows the structure of an information recording/reproducing system (apparatus) according to a fourth embodiment of the present invention. In the fourth embodiment, a Viterbi decoder 240 is added to the structure of the third embodiment shown in FIG. 16. In other words, in the embodiment of FIG. 23, not the record data RD but a discrimination result D240 produced from the Viterbi decoder 240 is used as an input to the pattern determination section 210. When the Viterbi discrimination result D240 is used, sub-zero portions of the distributions shown in FIGS. 5A and 5B will disappear and a calculation error may occur at the time of finding the record waveform pulses E230. However, when phase adjustment between record data RD and reproduction signal E200 is difficult, the use of Viterbi decoder 240 as in the embodiment of FIG. 23 is effective.

The present invention is not limited to the above embodiments, and various modifications and alterations may be made without departing from the spirit of the invention, when the invention is put to practical use.

In the above descriptions of the embodiments, PR (1,2, 2,1) characteristics are used. This invention can also be carried out using other PR characteristics. In addition, this invention can be performed using modulation codes other than the RLL (1,7) code.

In the above description, the recording compensation parameter Ec is calculated from the relationship, $(-\sigma 2*M3+\sigma 3*M2)/(\sigma 2+\sigma 3)$. Alternatively, the recording compensation parameter Ec may be calculated from the relationship, $(M2-M3)/2$, instead of $(-\sigma 2*M3+\sigma 3*M2)/(\sigma 2+\sigma 3)$. Thereby, the structure of the system can be simplified.

Summary of Embodiments (1) A first pattern including a code bit train "10" or "01", a second pattern including "00" corresponding to the code bit train "10" or "01", and a third pattern including "11" corresponding to the code bit train "10" or "01" are prepared as object patterns. Then, record compensation is performed such that the errability that a reproduction signal obtained when the first pattern has been recorded may erroneously be recognized as the second pattern may become equal to the errability that a reproduction signal obtained when the first pattern has been recorded may erroneously be recognized as the third pattern.

(2) A distance difference D=Ee−Eo is obtained from a distance Eo between the reproduction signal and the first pattern and a distance Ee between the reproduction signal and the second or third pattern. Using a mean value of D and a standard deviation σ, the quality of the reproduction signal is determined from a value expressed by M/σ.

(3) A distance E1 between the reproduction signal and the first pattern, a distance E2 between the reproduction signal and the second pattern and a distance E3 between the reproduction signal and the third pattern are found. Then, D2=E2−E1, and D3=E3−E1 are found. A value Ec is obtained by an equation, Ec=(−σ2*M3+σ3*M2)/(σ2+σ3), wherein M2 is a mean value of D2, σ2 is a standard deviation, M3 is a mean value of D3, and σ3 is a standard deviation. From Ec, a record waveform compensation amount is found.

(4) Alternatively, Ec is converted to Ec' on the basis of the frequency of occurrence, and the recording waveform compensation amount is found from Ec'.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording compensation method for performing information recording on an information recording medium or information reproduction from the information recording medium, using a predetermined reproduction signal, a first pattern corresponding to a signal waveform pattern of the reproduction signal, a second pattern corresponding to the signal waveform pattern of the reproduction signal and being different from the first pattern, and a third pattern corresponding to the signal waveform pattern of the reproduction signal and being different from the first pattern and the second pattern, the method comprising:

finding a first distance E1 between the reproduction signal and the first pattern, a second distance E2 between the reproduction signal and the second pattern, and a third distance E3 between the reproduction signal and the third pattern;

finding a first distance difference D2=E2−E1 between the first distance E1 and the second distance E2, and a second distance difference D3=E3−E1 between the first distance E1 and the third distance E3;

finding a recording compensation parameter on the bases of the first distance difference D2 and the second distance difference D3;

compensating a signal recording waveform for the information recording medium on the basis of the recording compensation parameter;

finding a distribute on of the first distance difference D2 and a distribution of the second distance difference D3 with respect to a plurality of samples of the reproduction signal;

finding a mean value M2 of the first distance difference D2 and a standard deviation σ2 of the distribution of the first distance difference D2, and a mean value M3 of the second distance difference D3 and a standard deviation σ3 of the distribution of the second distance difference D3;

finding a recording compensation parameter Ec from a relationship of (−σ2*M3+σ3*M2)/(σ2+σ3); and compensating a signal recording waveform for the information recording medium on the basis of the recording compensation parameter Ec.

2. A method according to claim 1, wherein said first pattern includes a code bit train "10" or "01", said second pattern is a pattern having the same number of bits as the first pattern, the second pattern including "11" corresponding to the code bit train "10" or "01" of the first pattern, and said third pattern is a pattern having the same number of bits as the first pattern, the third pattern including "00" corresponding to the code bit train "10" or "01" of the first pattern.

3. A recording compensation method for performing information recording on an information recording medium or information reproduction from the information recording medium, using a predetermined reproduction signal, a first pattern corresponding to a signal waveform pattern of the reproduction signal, a second pattern corresponding to the signal waveform pattern of the reproduction signal and being different from the first pattern, and a third pattern corresponding to the signal waveform pattern of the reproduction signal and being different from the first pattern and the second pattern, the method comprising:

finding a first distance E1 between the reproduction signal and the first pattern, a second distance E2 between the reproduction signal and the second pattern, and a third distance E3 between the reproduction signal and the third pattern;

finding a first distance difference D2=E2−E1 between the first distance E1 and the second distance E2, and a second distance difference D3=E3−E1 between the first distance E1 and the third distance E3;

finding a recording compensation parameter on the bases of the first distance difference D2 and the second distance difference D3;

compensating a signal recording waveform for the information recording medium on the basis of the recording compensation parameter;

finding a distribution of the first distance difference D2 and a distribution of the second distance difference D3 with respect to a plurality of samples of the reproduction signal;

finding a mean value M2 of the first distance difference D2 and a standard deviation σ2 of the distribution of the first distance difference D2, and a mean value M3 of the second distance difference D3 and a standard deviation σ3 of the distribution of the second distance difference D3;

finding a recording compensation parameter Ec from a relationship of (−σ2*M3+σ3*M2)/(σ2+σ3);

converting the recording compensation parameter Ec to a recording compensation parameter Ec' on the basis of frequency-of-occurrence information on various patterns determined based on properties of modulation codes; and compensating a signal recording waveform for the information recording medium on the basis of the recording compensation parameter Ec'.

4. A recording/reproducing system for performing information recording on an information recording medium or information reproduction from the information recording medium, using a predetermined reproduction signal, a first pattern corresponding to a signal waveform pattern of the reproduction signal, a second pattern corresponding to the signal waveform pattern of the reproduction signal and being different from the first pattern, and a third pattern corresponding to the signal waveform pattern of the reproduction signal and being different from the first pattern and the second pattern, the system comprising:

a first arithmetic section configured to find a first distance E1 between the reproduction signal and the first pattern, a second distance E2 between the reproduction signal and the second pattern, and a third distance E3 between the reproduction signal and the third pattern;

a second arithmetic section configured to find a first distance difference D2=E2−E1 between the first distance E1 and the second distance E2, and a second distance difference D3=E3−E1 between the first distance E1 and the third distance E3;

a third arithmetic section configured to find a recording compensation parameter on the bases of the first distance difference D2 and the second distance difference D3; and a compensating section configured to compensate a signal recording waveform for the information recording medium on the basis of the recording compensation parameter, wherein the third arithmetic section comprises:

a fourth arithmetic section configured to find a distribution of the first distance difference D2 and a distribution of the second distance difference D3 with respect to a plurality of samples of the reproduction signal;

a fifth arithmetic section configured to find a mean value M2 of the first distance difference D2 and a standard deviation $\sigma 2$ of the distribution of the first distance difference D2, and a mean value M3 of the second distance difference D3 and a standard deviation $\sigma 3$ of the distribution of the second distance difference D3;

a sixth arithmetic section configured to find a recording compensation parameter Ec from a relationship of $(-\sigma 2*M3+\sigma 3*M2)/(\sigma 2+\sigma 3)$; and a conversion section configured to convert the recording compensation parameter Ec to a recording compensation parameter Ec' on the basis of frequency-of-occurrence information on various patterns determined based on properties of modulation codes, and wherein said compensation section compensates a signal recording waveform for the information recording medium on the basis of the recording compensation parameter Ec'.

5. A system according to claim 4, wherein said first pattern includes a code bit train "10" or "01", said second pattern is a pattern having the same number of bits as the first pattern, the second pattern including "11" corresponding to the code bit train "10" or "01" of the first pattern, and said third pattern is a pattern having the same number of bits as the first pattern, the third pattern including "00" corresponding to the code bit train "10" or "01" of the first pattern.

* * * * *